US006675174B1

(12) United States Patent
Bolle et al.

(10) Patent No.: US 6,675,174 B1
(45) Date of Patent: Jan. 6, 2004

(54) SYSTEM AND METHOD FOR MEASURING SIMILARITY BETWEEN A SET OF KNOWN TEMPORAL MEDIA SEGMENTS AND A ONE OR MORE TEMPORAL MEDIA STREAMS

(75) Inventors: Rudolf Maarten Bolle, Bedford Hills, NY (US); Arun Hampapur, White Plains, NY (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/496,604

(22) Filed: Feb. 2, 2000

(51) Int. Cl.[7] .............................................. G06F 17/30
(52) U.S. Cl. ................................... 707/104.1; 707/102
(58) Field of Search ............................... 707/100, 102, 707/104.1; 345/723

(56) References Cited

U.S. PATENT DOCUMENTS

| | | | |
|---|---|---|---|
| 4,677,466 A | | 6/1987 | Lert, Jr. et al. ............... 725/22 |
| 5,151,788 A | | 9/1992 | Blum ........................ 348/725 |
| 5,225,904 A | * | 7/1993 | Golin et al. ............... 271/18.1 |
| 5,343,251 A | | 8/1994 | Nafeh ........................ 348/571 |
| 5,485,611 A | * | 1/1996 | Astle ............................ 707/1 |
| 5,504,518 A | | 4/1996 | Ellis et al. ..................... 725/22 |
| 5,557,330 A | * | 9/1996 | Astle ....................... 348/394.1 |
| 5,655,117 A | * | 8/1997 | Goldberg et al. ........... 707/102 |
| 5,696,866 A | | 12/1997 | Iggulden et al. .............. 386/46 |
| 5,708,477 A | | 1/1998 | Forbes et al. ................ 318/552 |
| 5,751,280 A | * | 5/1998 | Abbott et al. ............. 707/500.1 |
| 5,956,716 A | * | 9/1999 | Kenner et al. ................ 707/10 |
| 6,065,050 A | * | 5/2000 | DeMoney .................. 709/219 |
| 6,246,803 B1 | | 6/2001 | Gauch ........................ 382/276 |
| 6,360,234 B2 | * | 3/2002 | Jain et al. ................ 700/500.1 |

OTHER PUBLICATIONS

Rakesh Mohan, "Video Sequence Matching,"60 *Proceedings of the International Conference on Audio, Speech and Signal Processing*, IEEE Signal Processing Society, 1998.
J.M. Sanchez, X. Binefa, J. Vitria and P. Radeva, "Local Color Analysis for Scene Break Detection Applied to TV Commercials Recognition," *Proceedings of Visual 99*, pp. 237–244, 1999.

* cited by examiner

*Primary Examiner*—Greta Robinson
(74) *Attorney, Agent, or Firm*—Louis J. Percello; Law Office of Charles W. Peterson, Jr.

(57) ABSTRACT

This invention is a scaleable system to perform exact matching or similarity matching between a large store of reference temporal media sequences and a query target temporal media sequence. The system is not limited to finding exact matching media segments but also can find media segments that are similar. One kind of similarity between media segments is the similarity between a long commercial and a short commercial, where the short commercial is formed by sub-segments of the longer commercial. Another kind of similarity of two media segment is when they depict three-dimensional actions that are similar and imaged from similar viewpoints. Given a reference media segment, a multitude of features are computed in a consistent way from either predetermined or media content-dependent key intervals. These features are stored in segment index tables along with identifiers of the corresponding reference media segments. At search time, again, a multitude of features is computed from each key interval and now the features are used to search the segment index table for identifiers of stored media segments. If the key intervals are similar, many if not all, features computed from the key intervals point to the same reference media identifier.

26 Claims, 23 Drawing Sheets

FIG.10A

DOMAIN CODES, 1010

| d\c | 1 | 2 | 3 | 4 | ... | ... | N-1 | N |
|---|---|---|---|---|---|---|---|---|
| 1 | (1,i) (2,j) |  (2,j) (3,j) (k_max,i) |  (2,j) (3,j)  |  |  |  |  | (1,i) |
| 2 | (k_max,i) | (1,j) (1,j) (3,j) |  | (k_max,i) |  |  | (k_max,i) | (2,j) (k_max,i) |
| 3 | (1,i) (3,i) |  | (1,j) | (2,j) |  |  |  |  |
| 4 | (2,j) (3,j) | (k_max,i) | (1,j) (2,j) | (1,j) (k_max,i) |  |  | (k_max,i) |  (k_max,i) |
| 5 |  | (2,j) (3,j) | (3,j) | (3,j) |  |  |  |  |
| 6 | (k_max,i) |  |  | (3,j) |  |  |  | (3,j) (3,j) |
| 7 |  | (k_max,i) |  | (2,j) |  |  |  | (1,j) |
| 8 |  |  | (k_max,i) | (1,j) |  |  |  | (2,j) |

1020, FEATURE CODES

| FIG.11B-1 |
|---|
| FIG.11B-2 |

SYSTEM AND METHOD FOR MEASURING SIMILARITY BETWEEN A SET OF KNOWN TEMPORAL MEDIA SEGMENTS AND A ONE OR MORE TEMPORAL MEDIA STREAMS

CROSS REFERENCE TO RELATED APPLICATIONS

The present application is a related to U.S. patent application Ser. No. 09/496,926 to Rudolf M. Bolle et al., filed coincident herewith, and assigned to the assignee of the present invention.

FIELD OF THE INVENTION

This invention relates to the field of multimedia temporal information streams, such as video and audio, and databases of such streams. More specifically, the invention relates to the field of video and audio processing for detecting known reference streams in target streams and for retrieving streams from databases based upon measures of correlation or similarity between two streams. The invention also relates to similarity or correlation measurements of temporal media sequences.

BACKGROUND OF THE INVENTION

Traditional databases handle structured parametric data. Such databases, for example, can contain a lists of employees of a company, their salaries, home addresses, years of service, etc. Information is very easily retrieved from such databases by formulating parametric queries, e.g., 'retrieve the salary of employee X' or 'how many employees with x<salary<y live in city Y.'

Beyond data that can be represented in machine readable tabular form and, of course, machine readable text documents, many other forms of media are transitioning to machine readable digital form. For example, audio data such as speech and music and visual data such as images and video are more and more produced in digital form or converted to digital form. Large collections and catalogues of these media objects need to be organized similarly to structured traditional parametric data using database technology enhanced with new technologies that allow for convenient search and retrieval based on visual or audio content of the media. Such collections of media are managed using multimedia databases where the data that are stored are combinations of numerical, textual, auditory and visual data.

Audio and video are a special, peculiar type of data objects in the sense that there is a notion of time associated with this data. This type of data are referred to as streamed information, streamed multimedia data or temporal media. When transporting this data from one location to some other location for viewing and/or listening purposes, it is important that the data arrives in the right order and at the right time. In other words, if frame n of a video is displayed at time t, frame n+1 has to be at the viewing location at time t plus 1/30th of a second. Of course, if the media are moved or transported for other purposes, there is no such requirement.

Similarly to text documents, which can be segmented into sections, paragraphs and sentences, temporal media data can be divided up into smaller more or less meaningful time-continuous chunks. For video data, these chunks are often referred to as scenes, segments and shots, where a shot is the continuous depiction of space by a single camera between the time the camera is switched on and switched off, i.e., it is an image of continues space-time. In this disclosure, we refer to these temporal, time-continuous (but not necessarily space-continuous) chunks of media as media segments or temporal media segments. These media segments include video and audio segments and, in general, information stream segments. Examples of media segments are commercial segments (or groups) broadcast at regular time intervals on almost every TV channel; a single commercial is another example of a media segment or video segment.

Multimedia databases may contain collections of such temporal media segments in addition to non-streamed media objects such as images and text documents. Associated with the media segments may be global textual or parametric data, such as the director of the video/music (audio) or the date of recording. Searching these global keys of multimedia databases to retrieve temporal media segments can be accomplished through traditional parametric and text search techniques. Multimedia databases may also be searched on data content, such as the amount of green or red in images or video and sound frequency components of audio segments. The databases have to be then preprocessed and the results have to be somehow indexed so that these data computations do not have to be performed by a linear search through the database at query time. Searching audio and video databases on semantic content, the actual meaning (subjects and objects) of the audio and video segments, on the other hand, is a difficult issue. For audio, a speech transcript may be computed using speech recognition technology; for video, speech may be recognized, but beyond that, the situation is much more complicated because of the rudimentary state of the art in machine-iterpretation of visual data.

Determining whether a given temporal media segment is a member or segment, or is similar to a member or segment, of a plurality of temporal media streams or determining whether it is equal or similar to a media segment or equal or similar to a sub segment in a multimedia database is another important multimedia database search or query. A variant here is the issue of determining if a given temporal input media stream contains a segment which is equal or similar to one of a plurality of temporal media stream segments or determining if the input stream contains a segment which is equal or similar to a media segment in a multimedia database. To achieve this one needs to somehow compare a temporal media segment to a plurality of temporal media stream segments or databases of such segments. This problem arises when certain media segments need to be selected or deselected in a given temporal media input stream or in a plurality of temporal media input streams. An example here is the problem of deselecting or suppressing repetitive media segments in a television broadcast program. Such repetitive media segments can be commercials or commercial segments or groups which are suppressed either by muting the sound channel or by both muting the sound channel and blanking the visual channel.

Much of the prior art is concerned with the issue of commercial detection in temporal video streams. The techniques for detecting commercials or other specific program material can be more or less characterized by the method of commercial representation, these representations are: 1) global representations, 2) static frame-based representations, 3) dynamic sequence-based representations. Three examples that use global representation or properties of commercials are:

An example a method and apparatus for detection and identification of portions of temporal video streams containing commercials is described in U.S. Pat. No. 5,151,788 to Blum. Here, a blank frame is detected in the video stream, a timer is set for a given period after detection of a blank frame, and the video stream is tested for "activity" (properties such as sound level, brightness level and average shot length) during the period representative of a commercial advertisement. Here the property of commercials that they start with a blank frame and that the activity of a commercial is different from the surrounding video material are used as global properties of commercials. U.S. Pat. No. 5,696,866 to Iggulden et al. extend the idea of detecting a blank frame, to what they call "flat" frame which has a constant signal throughout a frame or within a window within the frame. In addition to a frame being flat at the beginning and end of a commercial, Iggulden et al. include that the frame has to be silent, i.e., there should be no audio signal during the flat frame. Further, a commercial event is analyzed with respect to surrounding events to determine whether this segment of the video stream is part of a commercial message or part of the regular program material.

U.S. Pat. No. 5,151,788 to Blum and U.S. Pat. No. 5,696,866 to Iggulden et al. detect commercials and commercial groups based on representations of commercials which are coarse and determined by examining global properties of commercials and, most importantly, the fact that a commercial is surrounded by two blank frames. Additional features of the video signal are used in U.S. Pat. No. 5,343,251 to Nafeh. Here features such as changes in the audio power or amplitude and changes in brightness of the luminance signal between program and commercial segments are used to train an artificial neural network which ideally has as output +1 for detected program and −1 for detected commercial. If the output of the trained neural network is −1, the broadcast audio and video is discerned.

Two examples that use static frame-based representations for commercials are: U.S. Pat. No. 5,708,477 to S. J. Forbes et al. uses the notion of an abbreviated frame for representing commercial video segments. An abbreviated frame is an array of digital values representing the average intensities of the pixels in a particular portion of the video frame. Each commercial is represented by an abbreviated frame, extracted from the first shot (scene) of the commercial, and the duration of the commercial. These abbreviated frames are stored in memory in a linked list where the ordering is determined by the total brightness of all the pixels in the video frame portion. Upon detection of a scene change in the live video stream, an abbreviated frame is computed along with the average intensity. An abbreviated frame in memory is found that has total brightness close to the computed abbreviated frame within a predetermined threshold. The best matching abbreviated commercial frame is found by traversing the linked list both in order of increasing total brightness and in order of decreasing total brightness. If a stored abbreviated commercial frame is found that matches the abbreviated frame in the live video stream within a predetermined threshold, the TV set is muted and/or blanked for the duration of the commercial. Note that finding a stored abbreviated frame which is close in average brightness to a current abbreviated frame is independent of the number of stored commercials; however, retrieving the identity of a commercial (a commercial with the same or close abbreviated frame as the current abbreviated frame, if this is even uniquely possible) will take search time which is in the order of the number of commercials stored in the database.

Many techniques described in commercial seeking literature, reduce videos to a small set of representative frames, or keyframes, and then use well-known image matching schemes to match the keyframes. An example of such a technique is presented in reference:

J. M. Sanchez, X. Binefa, J. Vitria, and P. Radeva, Local color analysis for scene break detection applied to TV commercial recognition, Third International Conference, Visual'99, Amsterdam, June 1999, pp. 237–244.

This reference is incorporated herein in its entirety.

Each commercial in the database is represented by a number of color histograms, a color histogram of a representative frame for each shot in the commercial. The shots of a commercial are detected by some shot boundary detection algorithm (finding scene breaks). Commercials are detected in a live video stream by comparing all the color histograms of all the commercials to a color histogram representing a shot in video stream. A color histogram is a vector of length n (n the number of colors) and comparing histograms amounts to measuring the distance between two vectors. In order to decrease the computation time for computing the distance between the two vectors, the eigenvectors of the covariance matrix of a large number M of vectors representing color histograms are computed. These eigenvectors form an orthogonal basis which span the color vector space. Rotating the color vectors and projecting the rotated vectors on the m-dimensional subspace spanned by the first m eigenvectors captures the principal components of the color vectors and does not change the amount of information about colors much. Hence comparing two color vectors of length n is close to comparing two rotated color vectors of length m. If, during the commercial seeking process a color vector computed from a shot in the live video is determined to be close to a color vector of some commercial A, it is assumed that this commercial is present in the live stream. This is verified by checking if the following color vectors representing shots in the live stream also are close to color vectors representing shots of commercial A.

Three examples that use dynamic sequence-based representations are:

U.S. Pat. No. 4,677,466 to Lert, Jr. et al. which uses signatures that are stored and used to determine the identity of a commercial. The video and audio signals are converted to digital samples by A/D converters. Video signatures are average values of consecutive samples of the video envelope, audio signatures are average values of consecutive samples of band-passed audio signals. Multiple events are defined which are used as potential start points for computing a signature from a video stream, either for storing reference signatures or for computing target signatures that are to be compared to reference signatures. Such events include the occurrence of a scene change in the video stream, a blank frame having silent audio followed by a non-blank frame, a predetermined magnitude change in the audio signal or color component of the video signal, and predetermined time periods after previously determined events. Upon detecting a stability condition, a comparison of samples of a frame and counterpart samples of a subsequent frame, after such an event, a video signature is extracted. This signature is compared to stored reference signatures using a technique which the author calls 'variable length hash code search.' Sequentially, the absolute difference between a first reference signature and extracted signature is calculated and when this is greater than a predetermined threshold, the variable range hash code search is continued. When the absolute difference is less than the threshold, a correlation coefficient between extracted and reference signature is computed. When this correlation is significantly high a possible match is recorded, otherwise the variable range hash code search is continued. Even if the correlation coefficient is sufficiently high but lower than a predetermined threshold, the variable range hash code search is further continued. Eventually, a commercial group will give rise to multiple signatures; the commercials are then identified by determining the sequential ordering of the matched signatures and predefined decision rules to recognize a particular repetitive broadcast. Note that this is a sequential process that compares reference features one at a time.

U.S. Pat. No. 5,504,518 to Ellis et al. also concerns itself with the detection of broadcast segments of interest (commercials) using dynamic key signatures to represent these segments. Key signatures include eight 16-bit match words derived from eight frames of broadcast video stream, where these frames are selected from the video segment to be identified according to specific rules. Thirty-two different areas within a frame are selected, each area paired with another area. The average luminance values of the 16 paired areas are compared producing a 1 or a 0 based on the average luminance values of the first set being 'greater or equal' or 'less than' those of the paired set, producing a 16-bit word. A 16-bit mask is also produced for each frame signature, where each bit indicates the susceptibility of the corresponding bit to noise (based on the magnitude of the absolute value of the difference of average luminance values). The keywords (or signatures) along with the match word and offset information are stored as representation of the broadcast segment.

For broadcast segment recognition, the received signal is digitized and 16-bit frame signatures are computed the same way as explained above. Each of these signatures is assumed to correspond to the first 16-bit word of one of the previously stored eight-word key signatures and compared to all key signatures beginning with that word. Then, using the offset information, subsequently computed words are compared with the corresponding stored words to determine if a match exists or not.

To increase the speed by which a stored key signature can be compared to a segment signature of a newly received broadcast is reduced by using a keyword lookup data reduction method. For this, one frame is selected from the frames corresponding to the key signature, in accordance with a set of predetermined rules. This frame is a key frame with an associated keyword. The key signature has still eight 16-bit words but the offset is measured with respect to the keyword. A keyword also may have multiple key signatures associated with it. This keyword is used with the lookup table find a smaller number of signatures that contain this keyword and thereby significantly reduce the number of signatures that have to be compared. Certain values of video frame signatures (keywords) occur more often than others which has two effects: 1) for those keywords many more signatures have to be compared, 2) these signatures also become closer together and the signature comparison (correlator) may report a false match. A video preprocessing step is introduced to produce video frame signatures which are more uniformly together. Note, however, that the introduction of a lookup table decreases the signature search time, this time is still linearly dependent on the number of commercials in the database although the slope of the linear dependency is reduced significantly.

Audio signatures are also computed by utilizing the fast Fourier transform. The audio signatures are handled similarly to the video signatures.

A method for matching and similarity searching of arbitrary video sequences, including commercials, is described in:

R. Mohan, "Video Sequence Matching",
International Conference on Acoustics, Speech and Signal Processing, (ICASSP),
Seattle, May 1998.

This reference and the patents cited above are incorporated herein by reference in their entirety.

Mohan defines that there is a match between a given video sequence and some segment of a database video sequence if each frame in the given sequence matches the corresponding frame in the database video segment. That is, the matching sequences are of the same temporal length; matching slow-motion sequences is performed by temporal sub-sampling of the database segments. The representation of a video segment is a vector of representations of the constituent frames in the form of a ordinal measure of a reduced intensity image of each frame. Before matching, the database is prepared for video sequence by computing the ordinal measure for each frame in each video segment in the database. Finding a match between some given action video sequence and the databases then amount to sequentially matching the input sequence against each sub-sequence in the database and detecting minimums.

PROBLEMS WITH THE PRIOR ART

Some of the problems with the prior art are now presented.

1. For many solutions, the representations that are used to characterize and match target video to stored reference videos are global video sequence properties. This reduces the problem of finding repetitive segments from an identification problem to the problem of detecting two or more classes of media. That is, program segments of certain characteristics can be detected but not identified.

2. For individual video segment identification, the representation of the video segments that are to be identified is reduced to representing a sequence of keyframes or a sequence of otherwise characteristic frames or to one or more digital representations of a time interval of the analog video and/or audio signal (signatures of keyframes, of sets of frames, of analog signal). So, the program segments that are to be identified are partially represented which increases the likelihood of false reject (mistakenly rejecting a pertinent segment).

3. In almost all prior art, the computation of signatures is started when certain predefined events occur in the video stream. A simple example of a video event here is the presence of a blank frame. This is the case for both deriving representations or signatures for reference videos and for triggering the computation of signatures in the target video. This again increases the likelihood of false rejects.

4. Features used for representing video segments of interest are computed from one frame at a time. No features or signatures are derived from combined multiple frames, being it consecutive frames or frames which are spaced in time further apart. Therefore, no explicit motion information can be incorporated in the video segment representations.

5. The video signature store representations are not designed to handle the large numbers of features that can potentially be extracted from video sequence segments. This inherently limits the number of video segments that can be distinguished, i.e., the discrimination power of the signatures will not extend beyond a certain (not very large) number of different reference video segments.

6. The prior art does not scale well because of the fact that the search techniques used for searching the reference signature database are inherently sequential. In combination with item 5 above, this makes the prior art unusable for large number of reference segments, e.g., the number of samples a system searches for simultaneously.

7. The schemes proposed hitherto are tailored specifically for matching identical segments or for segment that have a number of identical shots in common. The schemes do not generalize to other types of similarity measurement (examples include, structural similarity of sequences, motion similarity of sequences etc), where matching segments are not detected based on exact signature (feature) values but rather on signatures that are similar in some sense.

8. The schemes are rigid and can recognize subsections of the known segments only as defined according to certain rules. For example, a certain number of signatures have to be present in a target segment in order to match a reference segment.

OBJECTS OF THE INVENTION

An object of this invention is an improved system and method for exact matching of multimedia time sequences.

An object of this invention is an improved system and method for similarity matching of multimedia time sequences for multimedia database indexing and searching.

An object of this invention is a system capable of performing similarity matching of multimedia time sequences using a multiplicity of similarity metrics.

An object of this invention is a scaleable system (search time increases sub linearly with the reference set) for performing exact or similarity matching between a large of reference media sequences and a query time sequence.

An object of this invention is a scaleable system (search time increases sub linearly with the reference set) for performing exact or similarity matching between a large database of reference temporal media sequences and a query time sequence.

An object of this invention is a scaleable system (search time increases sub linearly with the reference set) for performing similarity measurement between segments of reference media sequences stored in a large database and a segment of query time sequence.

An object of this invention is to optimize the coding scheme to provide the best discrimination between the target sequences.

SUMMARY OF THE INVENTION

The present invention is a representation scheme and a search scheme for detection and retrieval of known stream-oriented data. Examples include video, audio (media streams) stock price data, binary data from a computer disk (for purposes of detecting known virus patterns). The invention comprises an off-line indexing phase where the representations for a set of known video (information) reference segments that are computed and stored in a segment index structure. For each segment, a set of key frames or key intervals (key intervals, for short) is determined, which can either be regularly sampled in time or based on the information content. From each key interval, a set of features is extracted from a number of regions in the key intervals. These regions can be different for each feature and are indexed by domain codes. The extracted features are quantized according to quantization intervals, where each interval is represented by a feature code. Hence, each key interval is coded by a set of domain code, feature code pairs. These pairs are used to populate the segment index structure, one structure for each feature. For the first feature and the first key interval of all the known segments, this table is a two-dimensional array, where the columns represent domain codes and the rows feature codes. The domain code, feature code cells of this array are populated by segment identifiers of the corresponding set of code pairs. A second array is established for the second feature and the first key frame or interval, and so on. The use of multiple index structures corresponding to the features provides flexibility to the invention to operate in a wide variety of applications. For the second key interval, this process is repeated in a second structure of two-dimensional arrays, indexed by time or number for regular or content-based key interval selection. The result is a compact data structure that allows for fast similarity detection and search of the known segments.

In the search and detection phase, the process of computing domain code, feature code pairs is repeated in real time from a target media stream. Additionally, a segment counter is initialized for each of the known segments. The computed code pairs are used to index into the segment index table. In the case that a first key interval of a known segment is encountered, many, if not all, of the code pairs will point to cells in the segment index table that contain the particular segment identifier and the appropriate segment counter will be incremented for all domain codes and all features. Using the two-dimensional arrays representing the second key interval of the reference segments, the accumulation is continued for the second key interval in the target stream. This process is repeated for features and key intervals till sufficient evidence is accumulated in the segment counter that a known reference segment is present.

BRIEF DESCRIPTION OF THE FIGURES

The foregoing and other objects, aspects and advantages will be better understood from the following non limiting detailed description of preferred embodiments of the invention with reference to the drawings that include the following:

FIG. 10A is a block diagram of a segment index table where one table is used for all key intervals.

DETAILED DESCRIPTION OF THE INVENTION

This system for measuring similarity between a set of known temporal media segments (reference streams) and one or more target media streams, or segments of target media streams, has two distinct aspects. The first aspect is called the index generation phase which builds representations of the reference temporal media streams, the second phase is called the recognition phase, where instances of the known segments in the target stream are recognized. The index generation phase is an off-line process that involves processing of the reference clips that are to be detected to generate representations of the clips in the form of the segment index table by extracting features. The recognition phase recognizes known media segments in the input target stream by processing the input stream to extract features and using the segment index table.

Figure 1A:
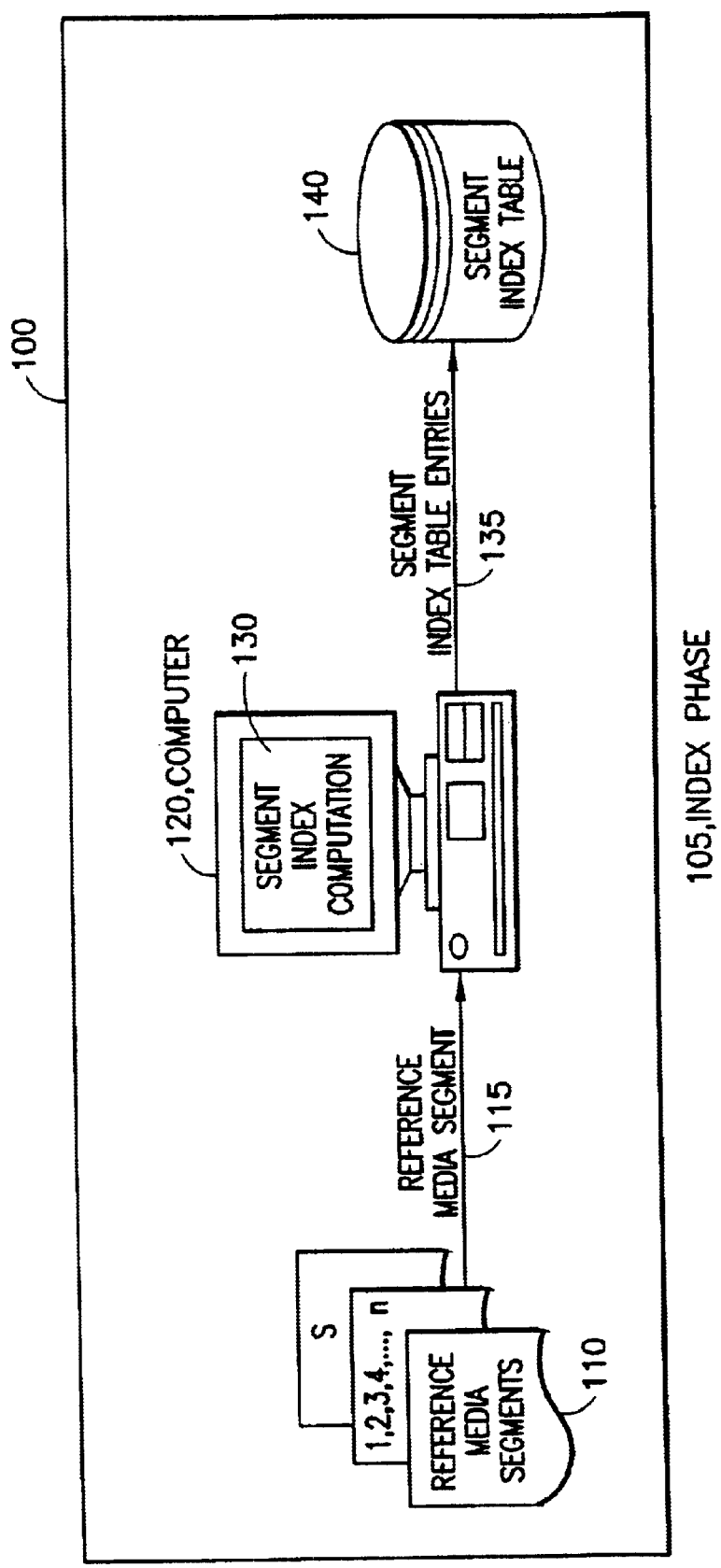
FIG. 1A is a block diagram of the indexing phase of one preferred system embodying the present invention.

In FIG. 1A a block diagram of a preferred indexing system 100 is shown. Diagram 100 shows the system that implements the indexing phase. Digital data storage 110 contains the set $S=s_1, \ldots, s_n$, of n reference media segments which is input 115 to computer 120. The segment index computation algorithm 130 running on computing system 120 determines the indices for each of the reference media segments $s_i$, i=1, . . . , n. These indices, in turn, are stored 135 in a segment index table, e.g., stored on computer disk 140 (or other memory) and can be used in the recognition/detection phase.

Figure 1B:
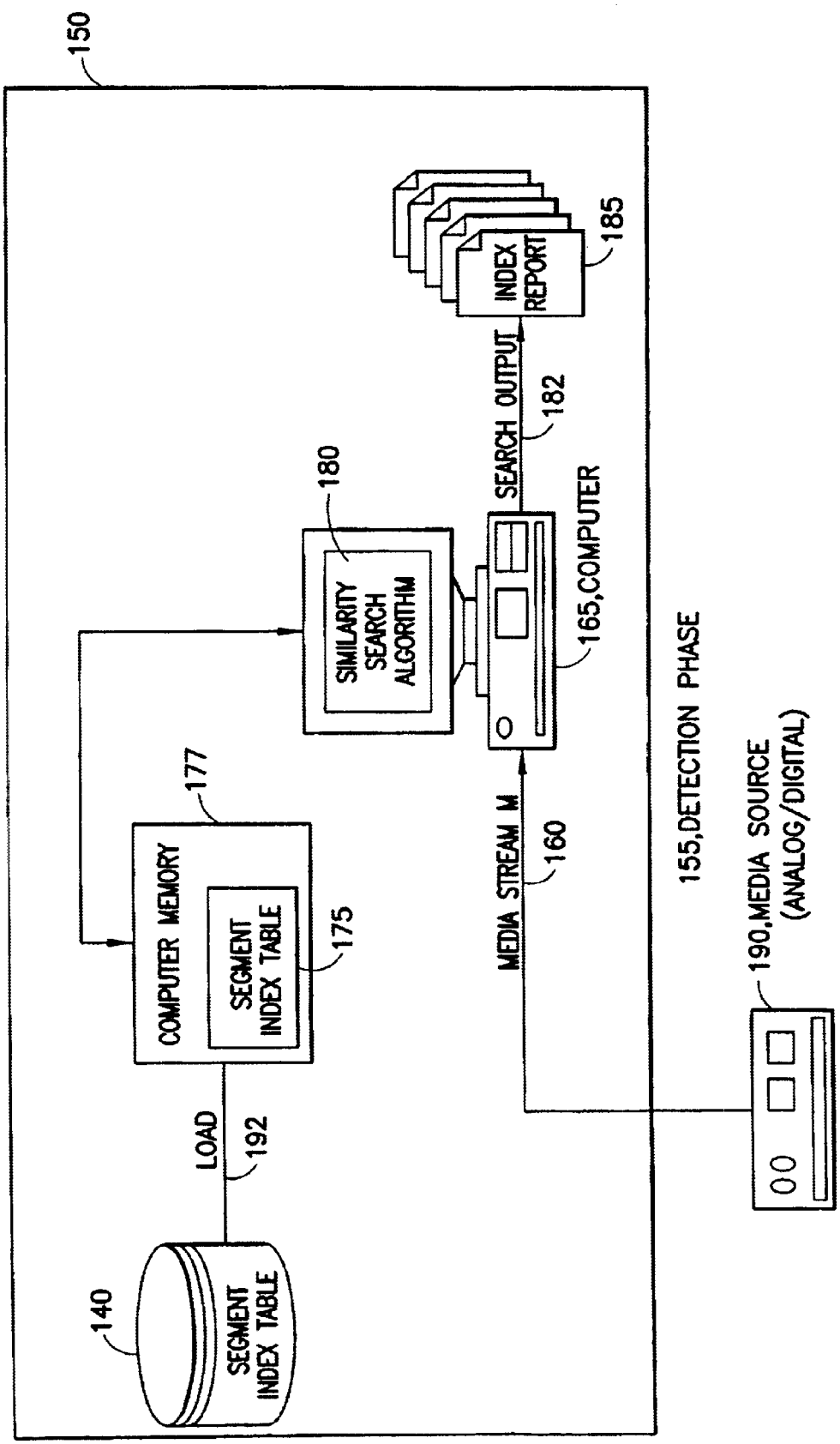
FIG. 1B is a block diagram of the detection phase of one preferred system embodying the present invention.

In FIG. 1B, a preferred recognition (detection) system 150 is shown. System 100 of FIG. 1A and system 150 of FIG. 1B embody some main aspects of the present invention. The detection system (recognition phase system) 150 takes as input one or more temporal digital target media sources M 160 stored on media source 190. Computer disk 140 contains segment index tables for various sets of reference media segments. Here the media could, for example, be digital video comprising an audio track and a visual track or a digital audio and video stream generated from an analog source using a frame grabber hardware. The recognition system 150 comprises a computing system 165 with attached 177 computer memory. The memory also contains a segment index table 175 containing current representations for the set $S=s_1, \ldots, s_n$, of n reference media segments being recognized. Similarity search algorithm 180 running on computer 165 uses the segment index table 175 for measuring the similarity between each of the reference media segments and sections of the target media stream. At time t, the similarity algorithm measures the similarities between the reference streams $s_1, \ldots s_n$ and the target stream M on channel 160 over the time intervals (t, t−1), (t, t−2), (t, t−3) . . . . If at some time $T_B$ the similarity between some sub-segment of the reference segment $s_x$ from $(t_a, t_b)$ and the target stream from $T_B$ and some $T_A$ ($T_A<T_B$) is large enough, it is reported 182 on the index report 185 that during the section ($T_A$, $T_B$) the target stream contains a media signal which is close to the sub-segment $(t_a, t_b)$ of reference media segment $s_x$. Depending on which reference media segments need to be detected in the target media stream, different segment index tables from computer disk 140 can be loaded 192 into computer storage 175.

Figure 11A:
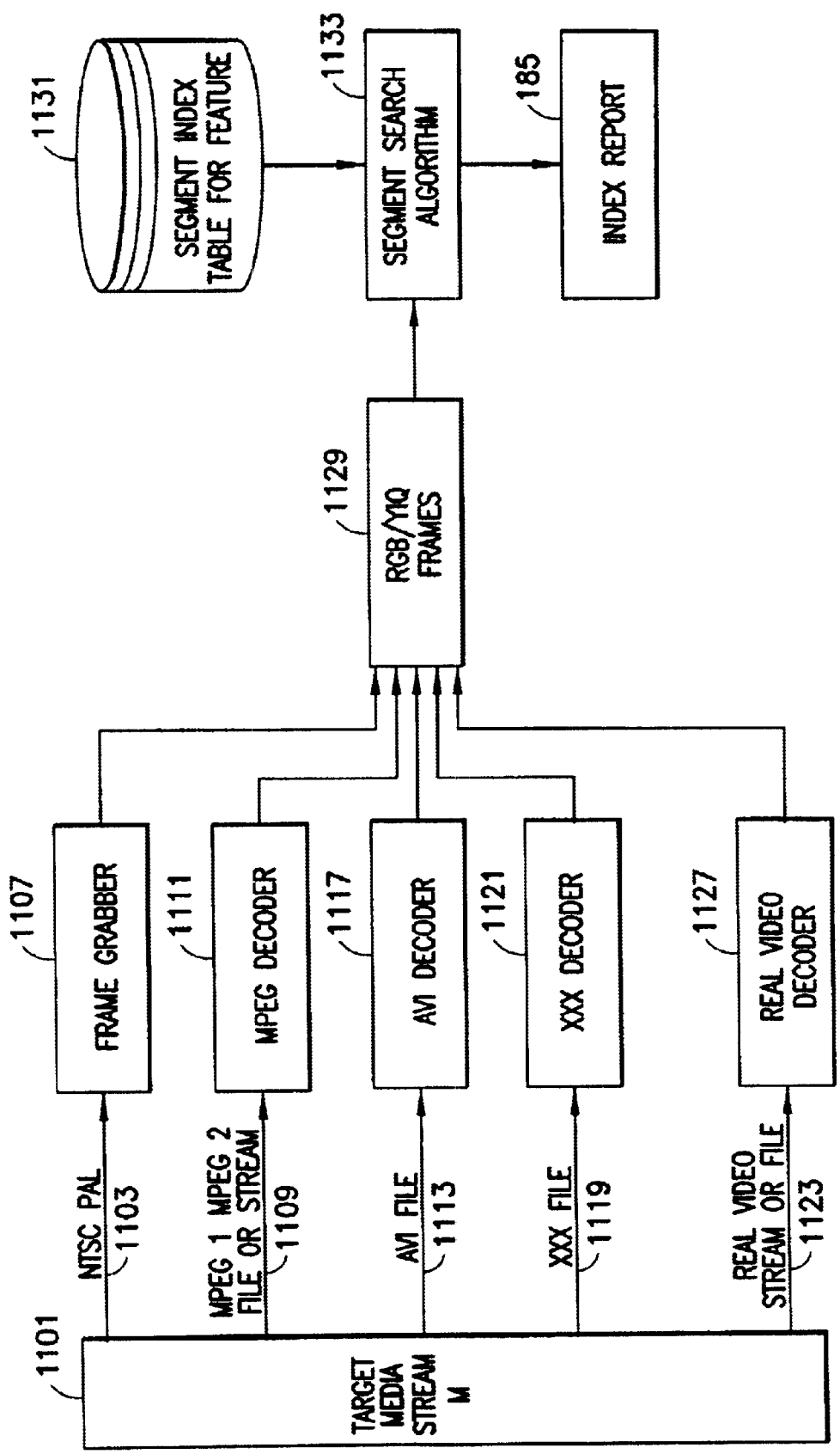
FIG. 11A is a detailed block diagram of the search process, illustrating how different formats of test media streams are handled in the search process.
Figures 1, 11B:
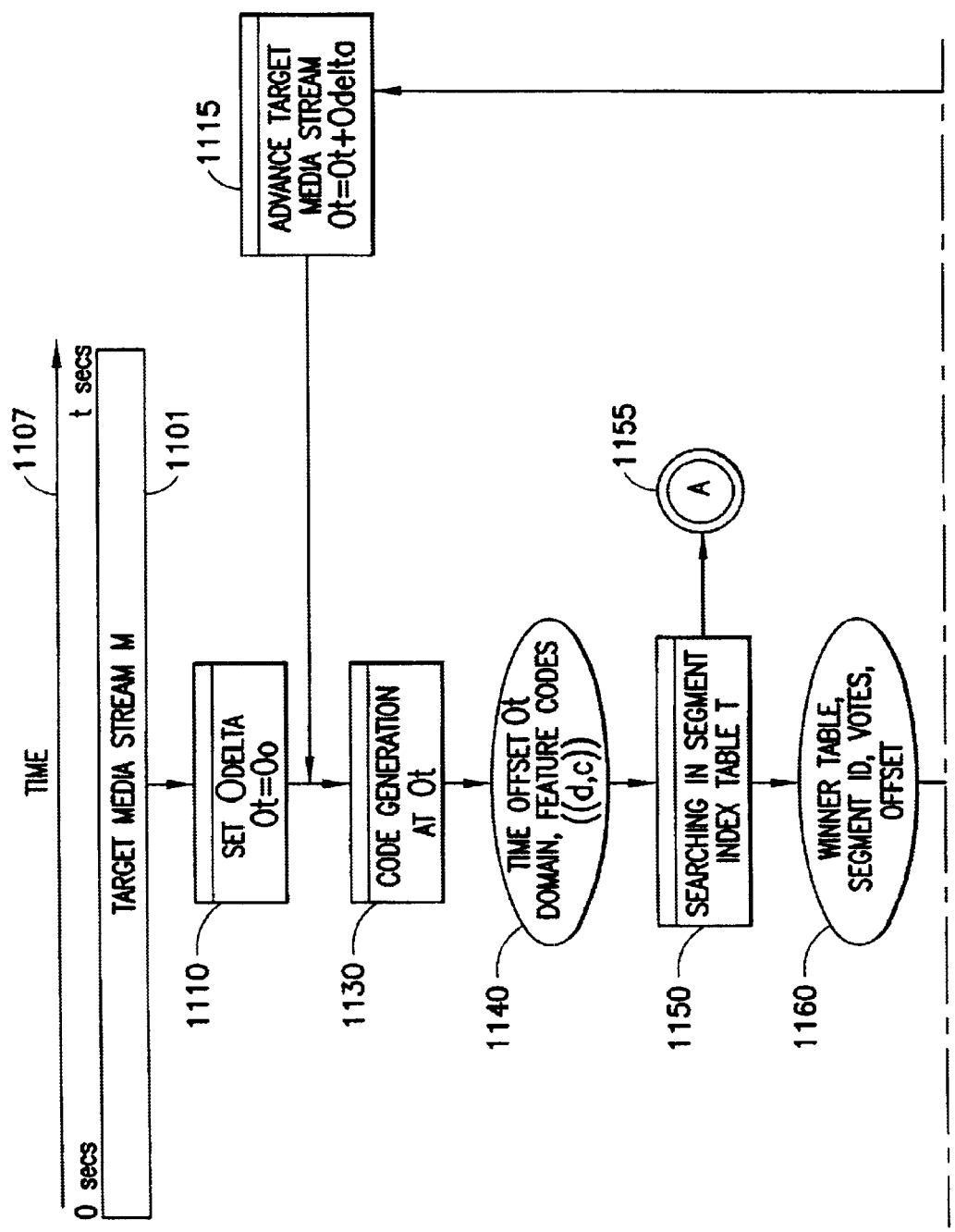
FIG. 11B, 11B-1, and 11B-2 is a flow chart of a search engine, providing a high level overview of the recognition/search process.
Figures 2, 11B:
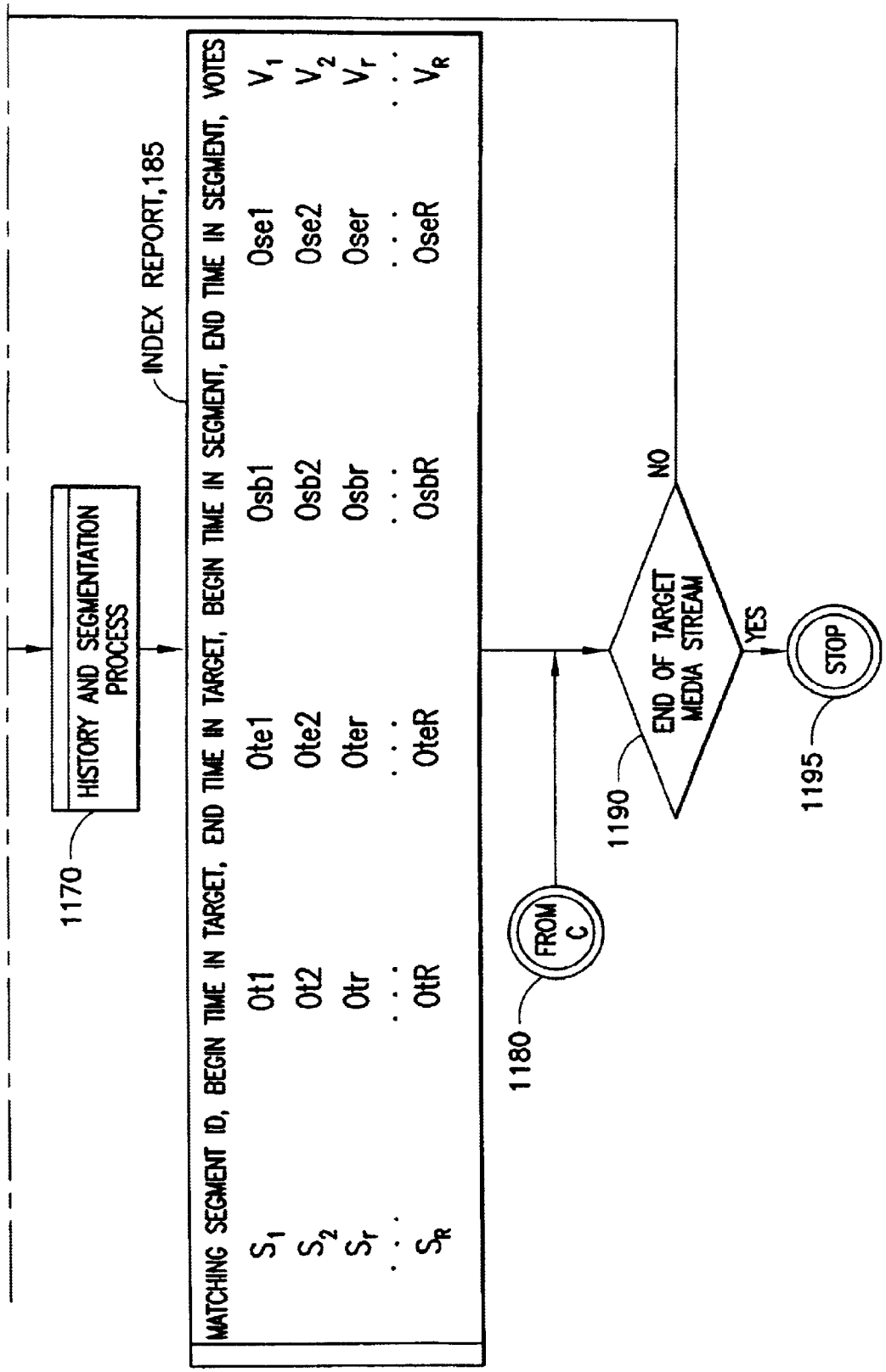

FIG. 2 shows a block diagram of the system architecture. The top portion (FIG. 2A) shows the index generation phase 210, i.e., the part of the system that handles the population of the segment index table and learns a representation (i.e., the segment index table 175) of the reference media segments 110. The teaming is achieved through indexing engine 220, which populates the segment index table 175. The bottom portion (FIG. 2B) sho ws the search or recognition phase 215 using the search engine 250. Here features are computed from the target incoming media stream M on channel 160. The instances of reference segments found in stream 160 are reported to index report 185. Each of these phases is described in detail below.

Figure 2A:
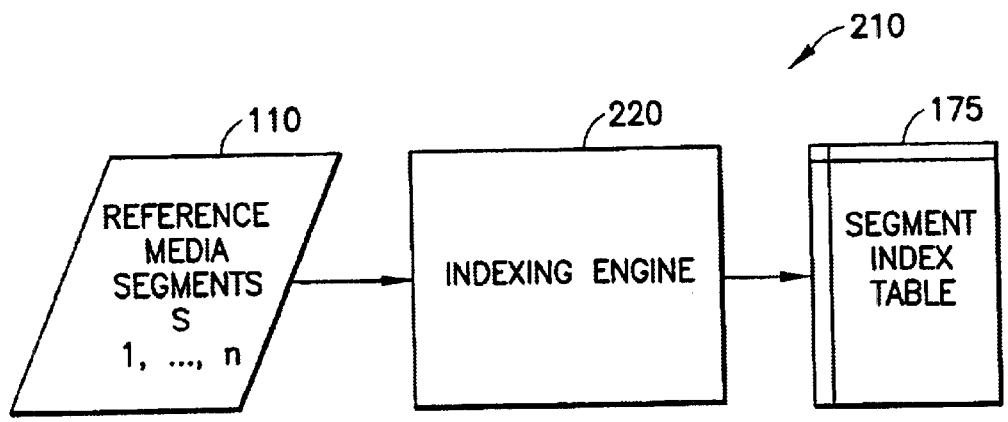
FIG. 2A is a block diagram of the system architecture showing an index generation phase.
Figure 2B:
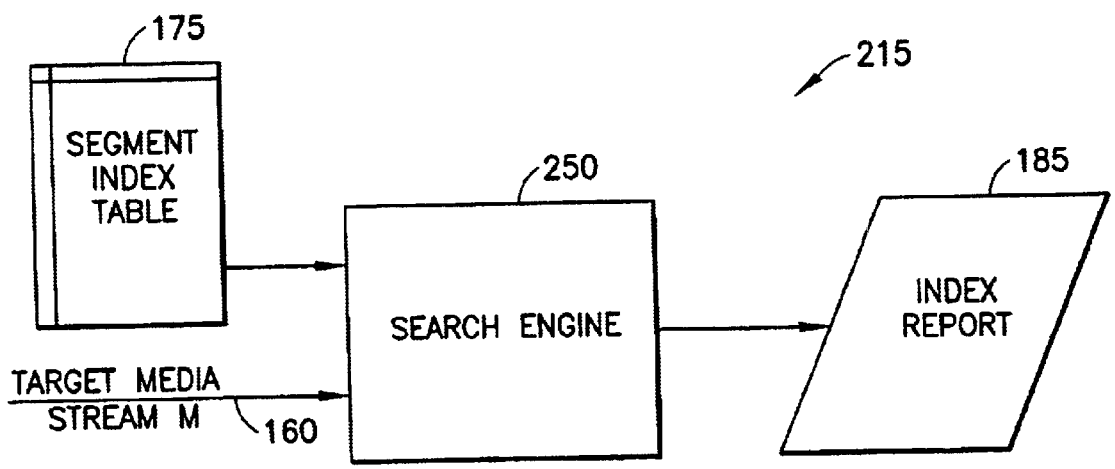
FIG. 2B is a block diagram of the system architecture showing a search phase.

The index generation phase, as shown in FIG. 2A, includes the key frame or key interval (hereafter referred to as key interval) selection step, the feature code generation step, and the segment index table population step. Each of these steps is discussed below. For the purposes of the description the following notations are used.

| | |
|---|---|
| M | target media stream in which the reference media streams are to be recognized |
| S | set of reference media segments to be indexed, this is the set of known media segments |
| n | number of reference media segments to be indexed |
| $s_i$ | reference media segment i |
| $L_i$ | length of reference media segment i measured in seconds |
| $k_i$ | number of key intervals selected from reference media segment i |
| $k_{max}$ | largest number of key intervals selected, i.e., max $\{k_i, i = 1, \ldots, n\}$ |
| $K_i(t)$ | is the key interval t in reference media segment i, where t = 1 , . . . , $k_i$ |
| m | total number of features used to generate the index codes |
| $F_j$ | the feature j, j = 1, . . . , m. |
| $C_j$ | $\{c_{j1}, c_{j2}, c_{j3}, \ldots, c_{jM(j)}\}$ the set of codes for the feature $F_j$ |
| M(j) | cardinality ($C_j$) is the number of code elements for feature j |
| $W_j$ | number of domain regions (domain codes) for the feature j (In the case of a windowing of video frames based on subdivision of the frame in $w_1$ horizontally and $w_2$ vertically, $W_j = w_1 \times w_2$) |
| T | segment index table |

Part of the feature-based indexing engine of FIG. 2A is t he key interval selection process. This process determines from which sequence of key intervals and/or from which sequence of audio key intervals the features are computed. That is, key interval selection is the process of selecting a subset of the media (visual track, audio track, or other media) for each of the known reference media segments $s_i$. The key intervals are used in the feature extraction process to generate the features $F_j$, j=1, ..., m. This process can be applied to both the audio and visual media of the media segment. The goal of the key-framing process is to generate a representation of the reference media segments in S. These representations must have a lowest possible data rate, while retaining enough data to allow for discrimination between the different samples in the sample set S.

There are several variables in the key interval selection process, which will be changed according to the application. The two main variables are the length of the key-interval and the spacing between key intervals. Some applications may choose to select all possible key intervals, where as others may select very widely spaced key intervals. The choice of these parameters will determine the accuracy with which the search process operates.

Figure 3:
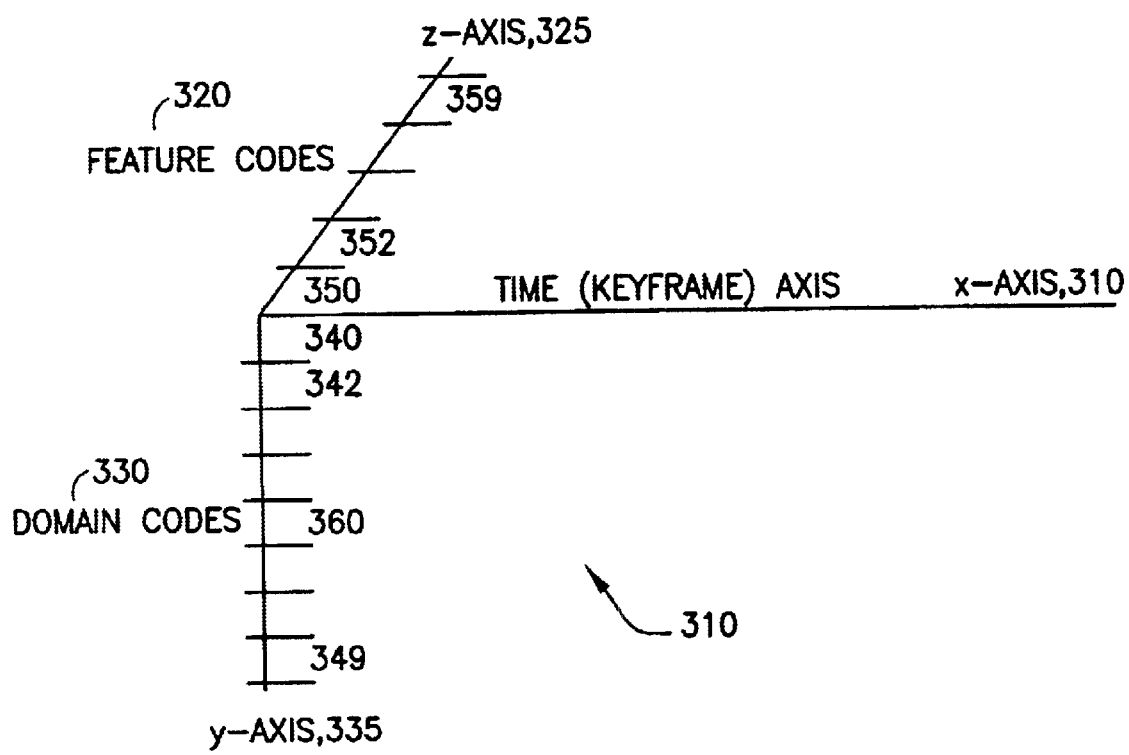
FIG. 3 is a diagram of a novel multidimensional feature code index table, one dimension being a domain-code axis, the other dimension being the feature-code axis and the horizontal dimension being the time (key frame/interval) axis.

The representations for the different reference media segments $s_i$ are stored in a segment index table described in FIG. 3. Along the x-axis or time (key interval) axis (310), for each key media interval or for each key audio interval, a two-dimensional array holds the feature codes 320 along the negative z-axis 325 and the domain codes 330 along the y-axis 335. Domain codes 340, 342, ..., 360, ..., 349 refer to regions in the key interval (media domain) or to regions in the domain of the transformed data in the key interval, for example, to regions in the frequency domain when the Fourier transform is applied to the key intervals. Feature codes 350, 352, ..., 359 refer to quantization intervals of the feature range. The set of domain codes is denoted by D the set of feature codes is denoted by C. The generation of the feature codes for key intervals is described in FIGS. 4 and 5. Domain codes are described in FIG. 5.

In a preferred embodiment, there are two criteria for selecting key intervals (a key interval refers to one or more media frames or an audio interval) from the media, regular sampling and content-based sampling.

For regular sampling, the key intervals are chosen at some fixed time offsets within the reference segment $s_i$. For example, in the case of audio, a key interval could be a 0.5 sec window of the audio signal selected at two second intervals. In the case of video, every 10th frame could be chosen as the key frame (interval) or every 10th through 12th frame could be chosen as a key interval. Of course, irregular samplings like every 1st and every 3rd frame are also possible.

In the case of content-based key interval selection, the key intervals are chosen based on properties of the media. For example, in the case of a video signal the key intervals can be chosen based on the location of scene changes. Key intervals can also be picked based on the relative change of content of the video from the beginning of a scene break. For example in the case of video, consider a video shot which provides a view of a scene by panning over different parts of the scene, in this case, key intervals may be selected where the change between different points in the scene is larger than a preset threshold. Further, key intervals can be selected based on motion information in the media, say, where the overall motion is a a local minimum. Or, on the other hand, key intervals can be selected where the motion is constant or at a local maximum. For the audio track, key intervals can be, for example, obtained by taking a window of audio data following a silence or key intervals can be selected based on frequency content. In general, any property of the media content can be used for content-based key interval selection.

Each of these criteria has its distinct advantages. Content-based key-framing or interval selection produces a more compact representation of the media. But during the recognition process, the same criteria have to be used on the target media stream and this adds to the amount of computation that needs to be performed at recognition time. The process of regular sampling can be affected by the load on the machine running the recognition process. If the frame rate of the recognition process drops due to the load on the machine, then during reference media segment detection the key-framing or interval selection process may generate spurious key frames or drop valid key frames. This, in turn, would affect the accuracy of the recognition process.

Figure 4A:
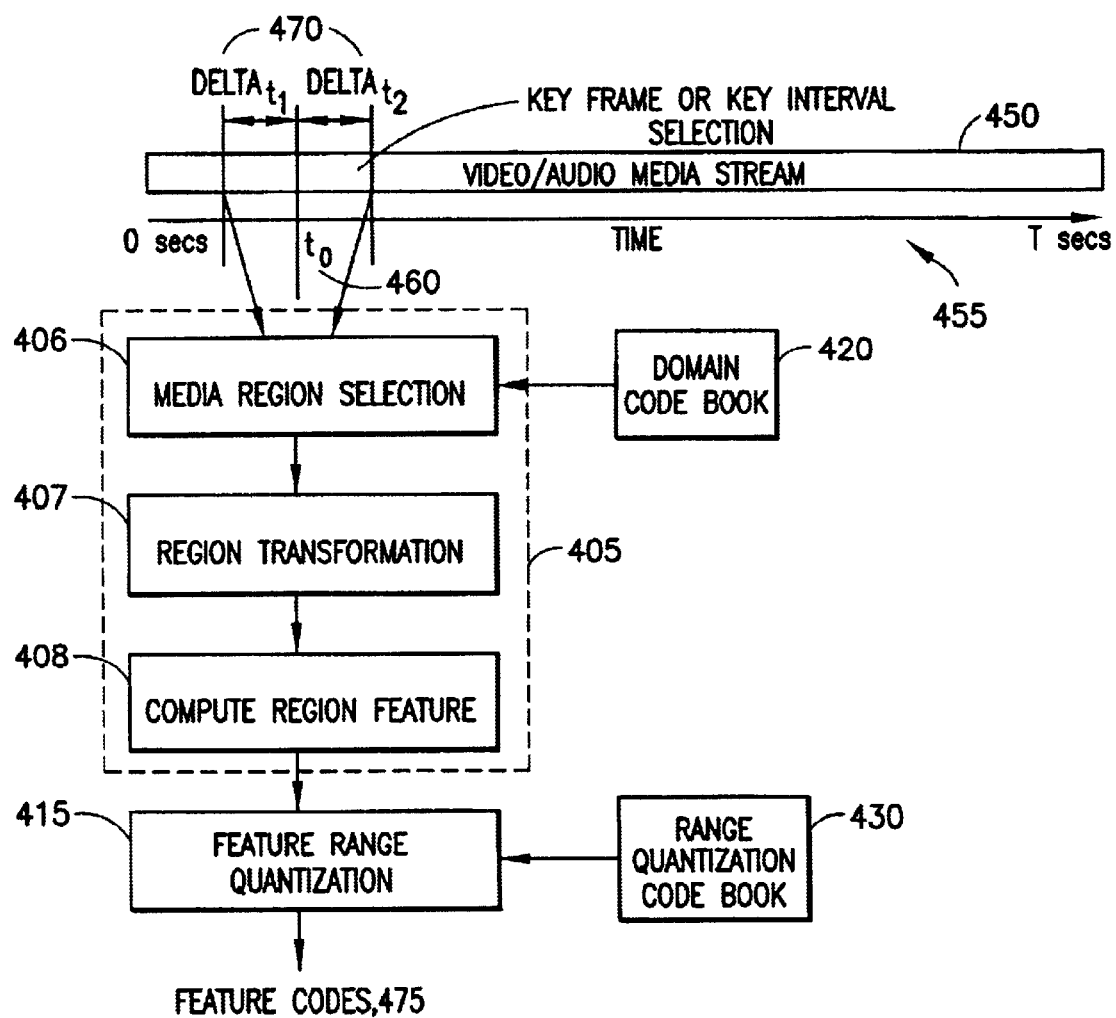
FIG. 4A is a flow chart of a feature coding process that creates feature codes for each of the reference clips, where the first media regions are selected and then the media within the regions is transformed.

Feature code computation consists of feature computation followed by quantization. The feature computation process 405 (see FIG. 4A) has three steps: media region selection 406 followed by media region transformation 407 and region-based feature computation 408. Another possibility for process 405 (FIG. 4B) is media transformation 417 followed by feature region selection 416 and region feature computation 408. The feature code generation process follows feature computation 405 in the form of feature range quantization 415. FIGS. 4A and B show the different steps involved in the process. In the following, in case of FIG. 4A the media is the domain, and in the case of FIG. 4B, the domain of the transformation is the domain. In the former case, the media is a function on the domain, in the latter, the feature is a function on the domain. Compare image function versus Fourier function, i.e., image plane vs. Frequency domain. In other approaches to the problem, the feature extraction and code generation processes are combined into one single step (U.S. Pat. No. 5,504,518 to Ellis et al.). In the present invention, these steps are distinct.

The feature transformation and feature extraction steps are dependent on the type of similarity to be measured. For example, image color based coding processes have been discussed in Smith et al. There are several other techniques of media transformation and feature computation that are well known in the art. See Smith and Chang, Tools and Techniques for Color Image Retrieval, In IS&T/SPIE Proc Vol2670, Storage and Retrieval for Image and Video Databases.

The feature-based code generation process is applied to all the key intervals selected by the key-framing process. The media target stream M in FIGS. 4A and B is depicted by a horizontal rectangle 450.

Time running from time 0 to time T seconds is indicated by the time axis 455. A key frame is selected at time is $t_0$ (460) or, alternatively, a key interval (470) is selected between times delta$_{t1}$ and delta$_{t2}$.

In general, the feature code computation is comprised of a number of steps. The complexity of each of the steps is dependent on the feature being considered. In this invention, for video we describe in more or less detail two visual features, namely, image color-based codes and optical flow-based codes. We also describe an auditory feature, Fourier transform-based feature code generation. As indicated above, this feature code generation process, that generates feature codes 475, is comprised of two steps, namely, the step where features are extracted 405 and a quantization or code generation step 415. Each of these steps is discussed below.

Referring again to FIGS. 4A and B, in the feature extraction step 405, the data in the key intervals are processed to extract different types of measurements or features. These measurements may be based on both global and local spatial or spatio-temporal properties of a key interval. These measurements may also be extracted from predetermined portions (regions) of the key intervals.

Figure 5:
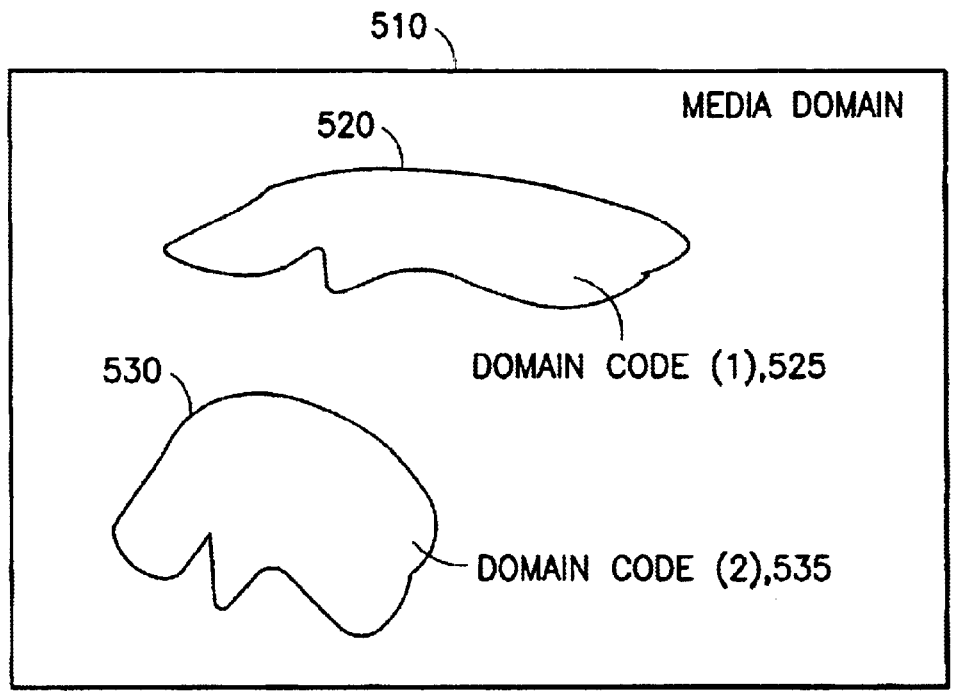
FIG. 5 is a sketch of an video frame with two arbitrary regions from which the features are computed.

For example, in FIG. 5 a key frame 510 (media domain) is shown with two arbitrary shaped regions (domain regions) 520 and 530. Only from the data in these regions, the features 475 are computed. The regions here can cover the complete key interval and the regions can differ for each feature $F_j$ with each feature j having a different number of local domain regions $W_j$.

Figure 6:
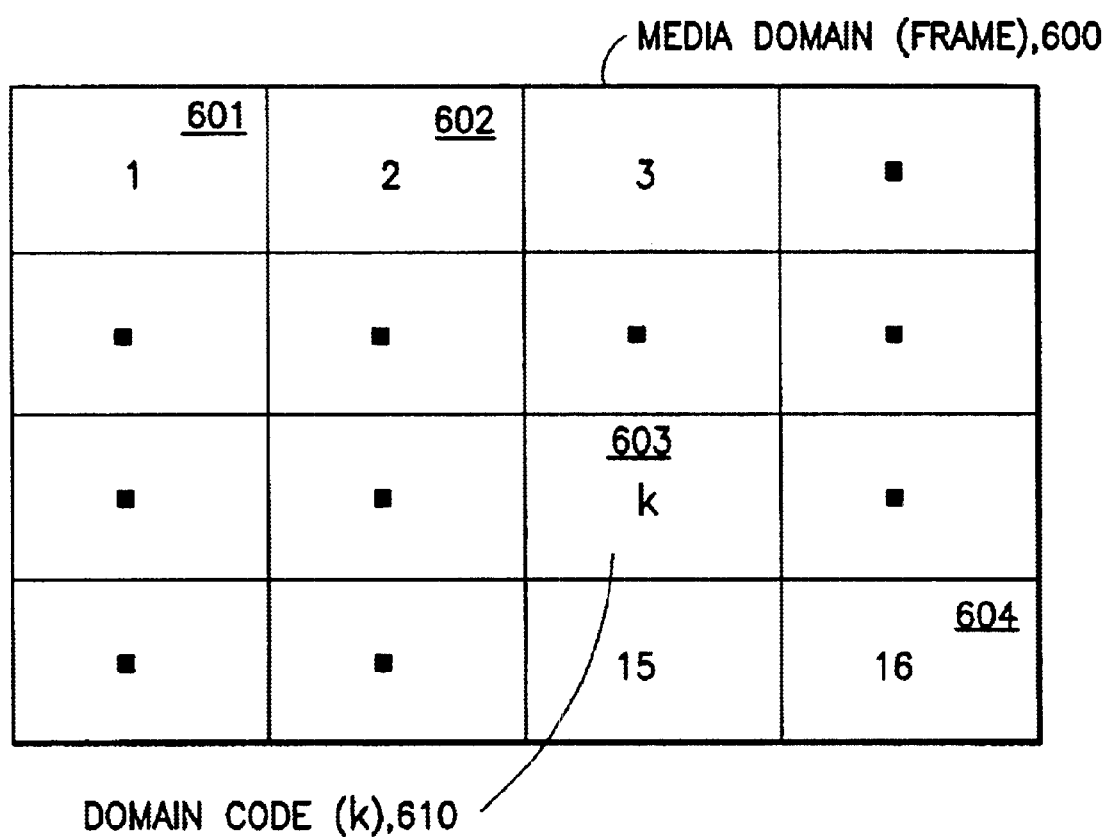
FIG. 6 is a video frame where the regions are rectangular windows (regions).

FIG. 6 shows an example where the media domain (key frames) 600 for feature $F_j$ are divided up into 16 rectangular windows (domain regions) 601, 602, . . . , 603, . . . , 604 (the local domain regions). Other windowing schemes are envisioned.

Figure 5A:
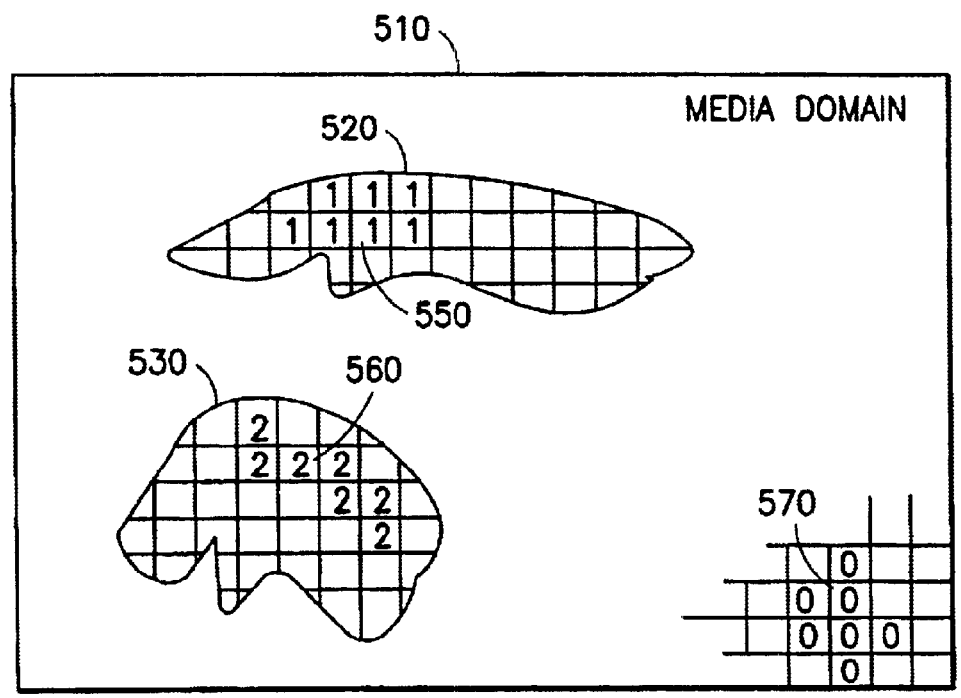
FIG. 5A is a sketch of a domain code implementation.
Figure 6A:
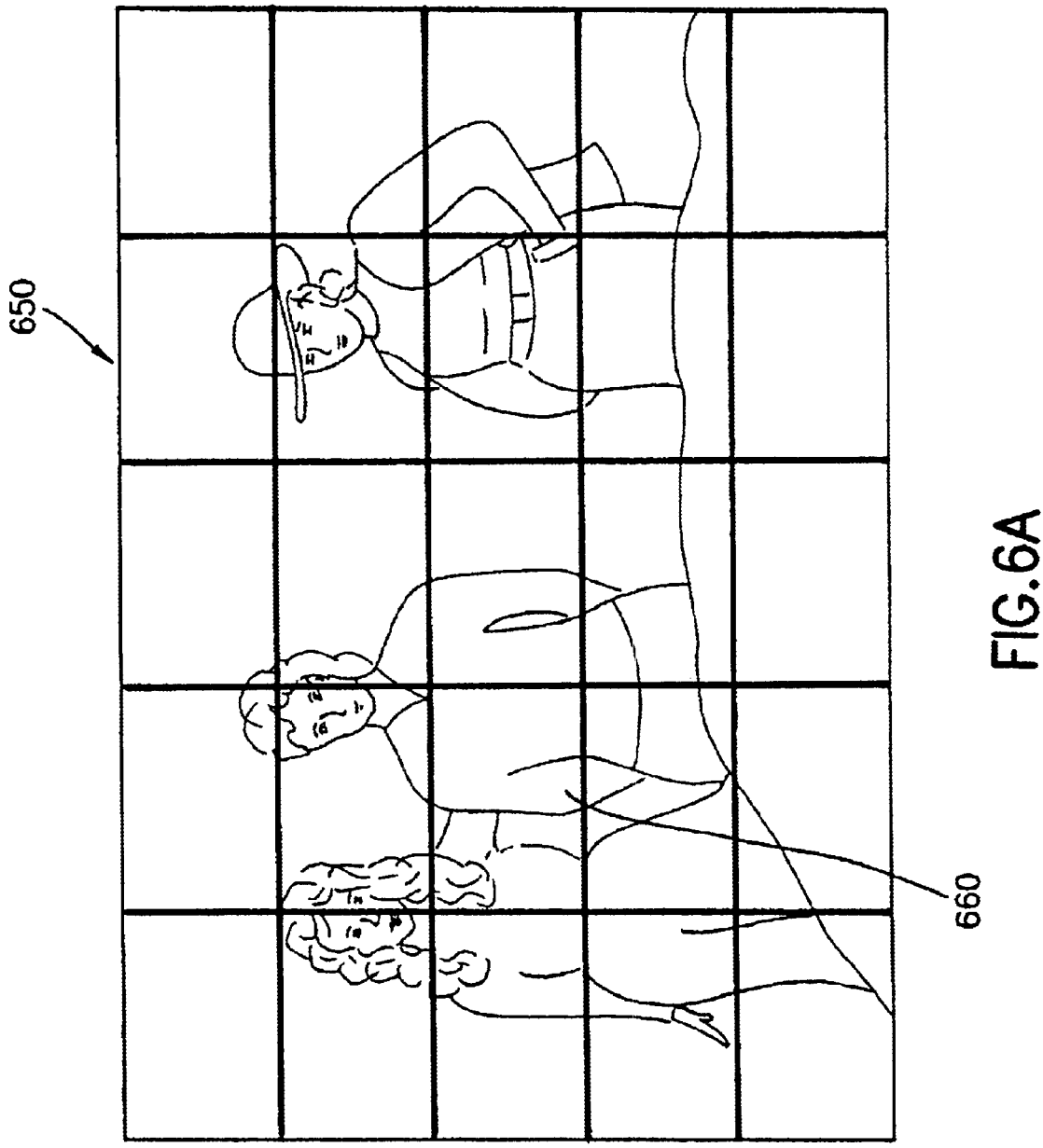
FIG. 6A is an example video frame with rectangular regions that show the data that is used for feature computation.

FIG. 6A gives an example of a video frame 650 with the window structure 601, 602, . . . , 603, . . . , 604 overlaid. Each window 660 contains data which is used for the domain region transformation 407; the media transformation 405 would use data in the whole frame 650. In the case where the domain regions are windows, with $w_1$ windows horizontally and $w_2$ windows vertically we have $W_j = w_1 \times w_2$ regions. The domain region code (domain code) book (420, FIG. 4A and B) for each feature j which has $W_j$ elements and could be implemented as an array of $W_j$ elements with each element pointing to a local-media region. This array is then stored in the domain code book 420. Another preferred method of implementing these domain codes is depicted in FIG. 5A. Here, as in FIG. 5, two regions 520 and 560 are used in the feature computation process 405 (FIG. 4A). The data points (pixels, samples) in 510 are marked '1' 550 if the points are in region 520 and are marked '2' 560 if the points are in region 530. Data points in 510 that are in neither region are marked '0' 570.

In the case of FIG. 5 with two local-media regions 520 and 530 in the media domain (frame) 510, and hence $W_j=2$, the first element 525 of the domain code book 420 Domain Code(1) 525 refers to region 520 while the second element 535 of the code book 420 Domain Code(2) 535 refers to region 530. Similarly, in FIG. 6 which is used to compute (say) feature $F_j$ with $W_j=16$, Domain Code(k) 610 refers to local media structuring region k 603. In FIG. 3, the segment index table, the y-axis corresponds to the domain codes in the domain code book 420 referring to the local-media regions, the z-axis corresponds to feature codes which refer to quantized feature values.

Referring to FIG. 4A, the code book 420 is used for media region selection 406 every time $t_0$ (460), i.e., a key interval is encountered. Each feature $F_j$, j=1, . . . , m is computed from the data in the appropriate regions using the different code books 420 for the different features $F_j$. The region transformation 407 depicts the transformation of media— into feature space, such features can be color space transformation, edge detection optical flow, etc. In general, the resulting feature values are not directly used as input to the feature quantization step (415). Rather, an intermediate transform 408 is applied that maps the features obtained by region transformation 407 into a smaller number of feature values for each $F_j$, j=1, . . . , m. An example is to compute the average hue for the regions 601, 602, . . . , 603, . . . , 604 in FIG. 6. Or, it maps a number of high-contrast edge element located in the form of video text into the coordinates of the window that contains the edge elements. In essence, the transformation 408 is a data reduction step so that the representations for the reference media streams $S=s_1, \ldots, s_n$ are as small as possible and yet the reference streams can still be distinguished.

Figure 4B:
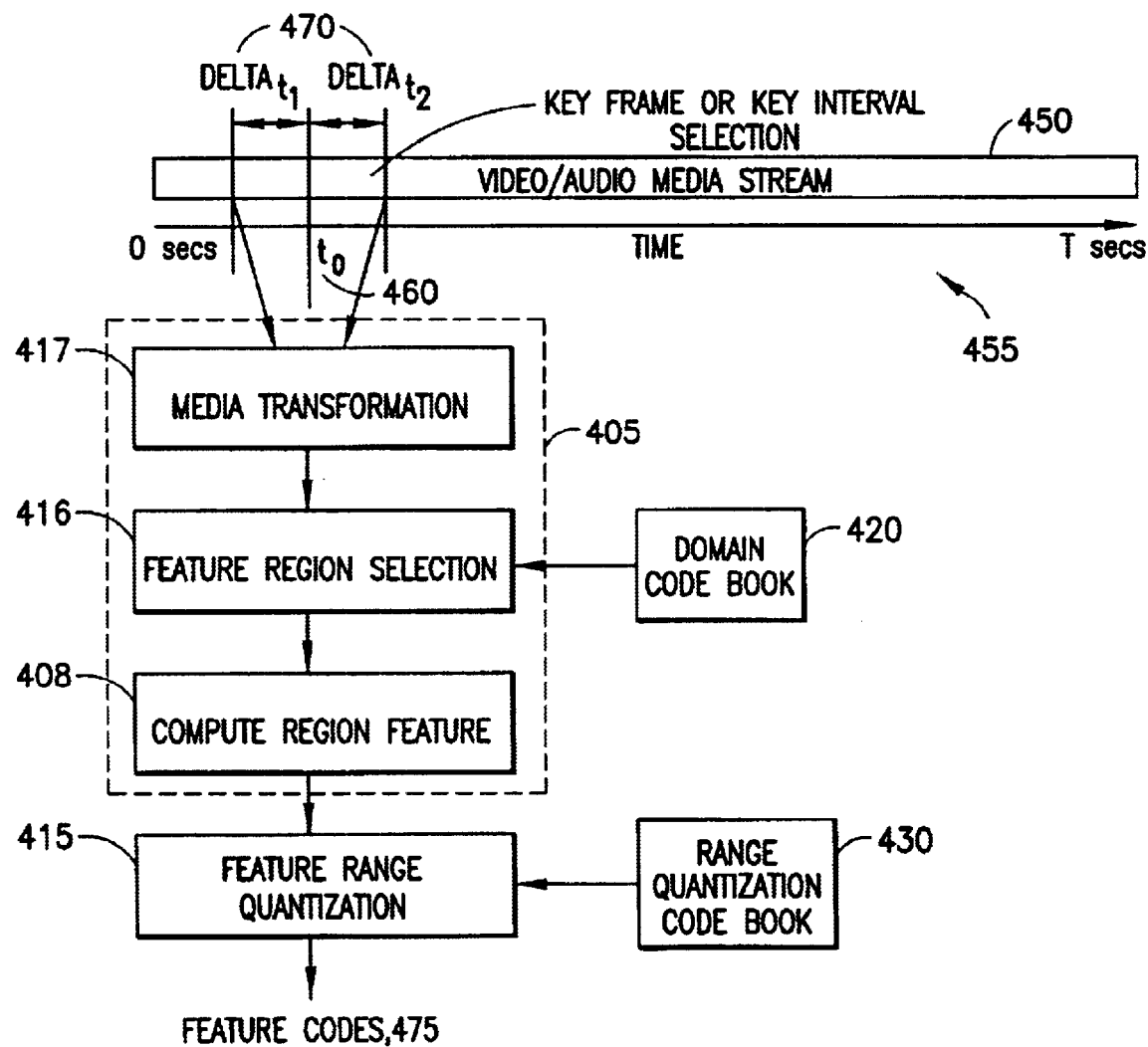
FIG. 4B is a flow chart of a feature coding process that creates feature codes for each of the reference clips, where the first a media transform is performed and then regions in the feature domain are selected.

Referring to FIG. 4B, it is also possible that all the data in the key interval is transformed through a media transform 417 into feature space is G. (In this case, feature space G is the domain.) Hence a mapping 417 is performed of all the data in a key interval into some feature space G. Then local regions of feature space G (feature regions), obtained through feature region selection 416, are used as input to the region feature computation step 408. In this case, the domain code book 420 contains Domain Code(1) . . . Domain Code($W_j$) for feature j with each domain code pointing to a local region in space G. An example of this case is the computation of features from the audio track. The key (time) interval now could be [$delta_{t1}$, $delta_{t2}$] (470 in FIG. 4B) and one of the features F can be the Fourier transform of this time interval. This gives the distribution of audio frequencies, from low to high, in the time interval [$delta_{t1}$, $delta_{t2}$]. The domain code book (420) points to regions in the domain [0, $f_{max}$) of G of the frequency distribution function (rather than the domain being the key interval). Where $f_{max}$ is the maximum frequency in the key interval. For instance, the domain code book could point to a subdivision of [0, $f_{max}$) into equal sub intervals (regions), and the output of transformation 408 (region-based-feature-computation) could be simply the average value or energy in the sub intervals (this is further explained in FIG. 9).

One advantage of using the domain code book, is that the codes generated can be changed by replacing the code book. Further, the codes generated can be dynamically changed based on some property of the key interval, by switching code books.

Finally, box 415 in FIGS. 4A and 4B represents the region feature range quantization process, the feature code generation 475. The values of the features extracted from the feature extraction process, which are used for feature code generation, have a bounded range. In order to represent the feature values as part of the segment index table of FIG. 3, the features need to be quantized into a finite set of codes (feature codes 320). The number of feature codes to be generated from a feature and the quantization levels used to generate these codes are critical parameters which depend on the nature of the specific feature and the type of reference segments in the segment set S. For each feature $F_j$, there exists a set $C_j$ of codes denoted by $\{C_1, C_2, C_3, C_4, \ldots, C_{M(j)}\}$ with M(j) the cardinality of $C_j$, the number of code elements for feature j. The feature range code book 430 determines which interval in the range of the feature function F should map into which code. In FIG. 3, the negative z-axis 325 represents the feature codes 320. For each feature $F_j$ that is used in the representation of the reference media streams S a table such as in FIG. 3 is needed.

Figure 7:
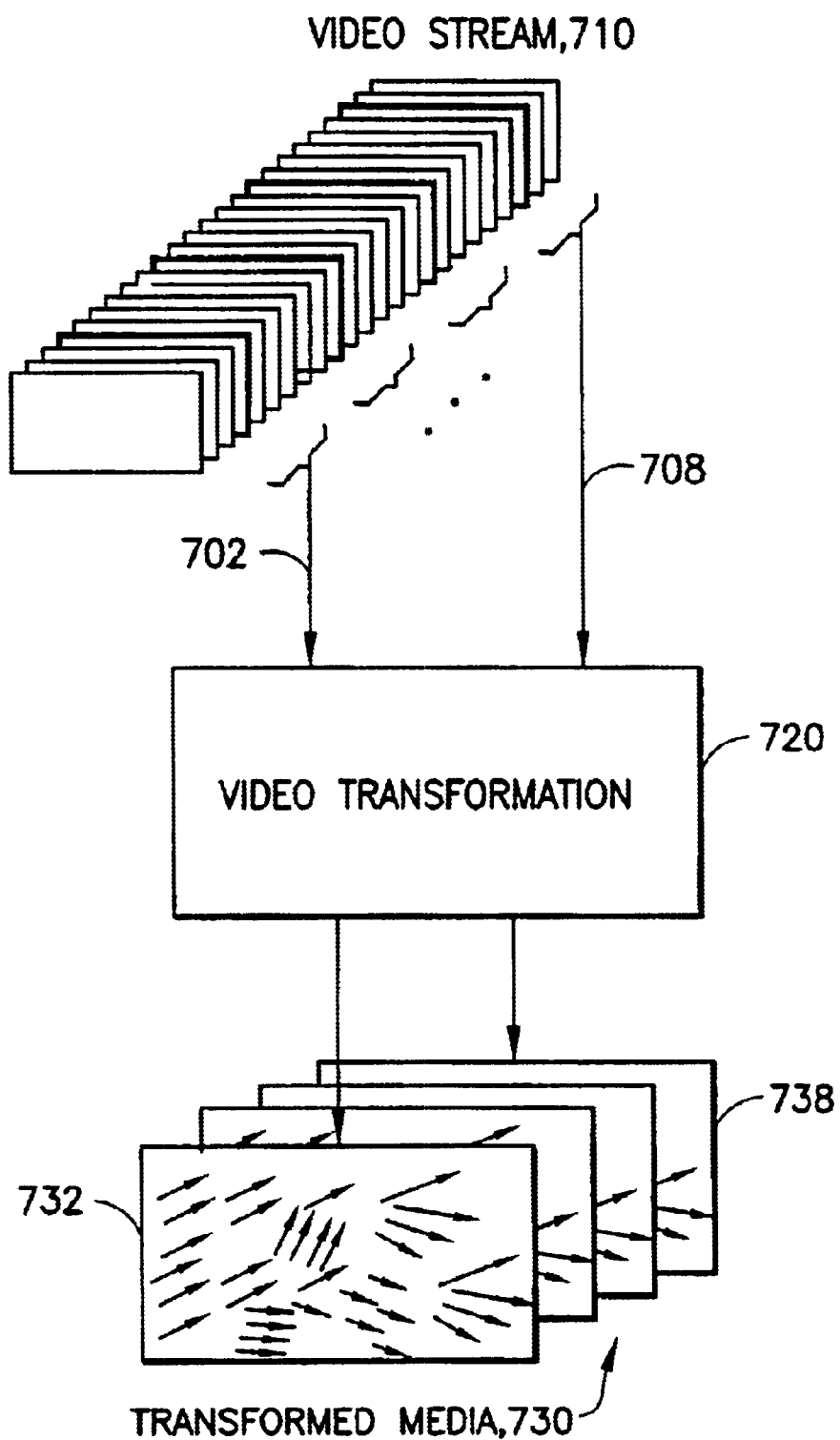
FIG. 7 shows a flow diagram of a video transformation where the regions span one or more frames and the media transformation is an optical flow computation.

The feature extraction can encompass many different transformations. In the case of visual media, it includes, computing the color histogram of a key frame, computing color histogram of selected spatial regions in the key frame, computing the pixel difference between two or more temporally displaced key frames, computing a measure to detect the presence of high-contrast regions in a key frame (like scene-text) or computing the optical flow or other spatial displacements between two subsequent frames (or possible spaced further apart) within a key interval. FIG. 7 shows this last case. A video stream 710 is the input to a video transformation 720 that computes the optical flow 730 (transformed media). A possible way to implement this is to select key intervals of frames 702 . . . 708 in video stream 710 as input to the video transformation 720. Each key interval is transformed into a feature domain which in this case are individual frames 732 ... 738 of optical flow. Every pixel in these frame contains two values, x and y, that together represent the optical flow at the pixel in vector form $(x, y)^t$. The optical flow is computed by comparing and matching two or more consecutive frames in the key intervals. Optical flow computation is well known in the prior art. Besides optical flow, any other transformation that has as domain two or more frames, be it consecutive frames or frames spaced apart, and maps this data into a function on some other domain can be used as features for indexing video sequences.

In the case of audio, feature extraction could include processes like computing the Fourier transform of a key interval, computing cepstral coefficients of a key interval, etc. In summary, the feature extraction process could be a mapping from key intervals into any finite dimensional space. Below we describe in more detail a key frame representation in terms of hue and an audio key interval in term of frequency magnitude.

Recognizing identical segments of video from the set S in a media stream M, can be achieved by using the following frame color codes. The color space of frames (images) has been extensively used for indexing and searching based on image content. Application of hue color code, a preferred embodiment of this invention, is comprised of a number of steps (see FIG. 8A).

Color is a good feature for video segment detection or recognition. In particular, the hue component of color contains much information. Hue is the portion of color information that indicates which color a particular pixel in frame 810 has. The colors range from red, green to magenta (see FIG. 8B.) Hence, from the video signal, which is as input to the system is typically in an RGB or YIQ format, the hue component has to be extracted. This requires a transformation from the original color space (RGB or YIQ) of the media to the HSV color space. This is achieved by using the standard algorithms for color space conversions (e.g., Foley & van Dam, Chapter 13). Once the image is transformed in to the HSV model, the hue channel is separated from the HSV model, as the code generation is based on the hue values of the pixels in the key frames.

Figure 8A:
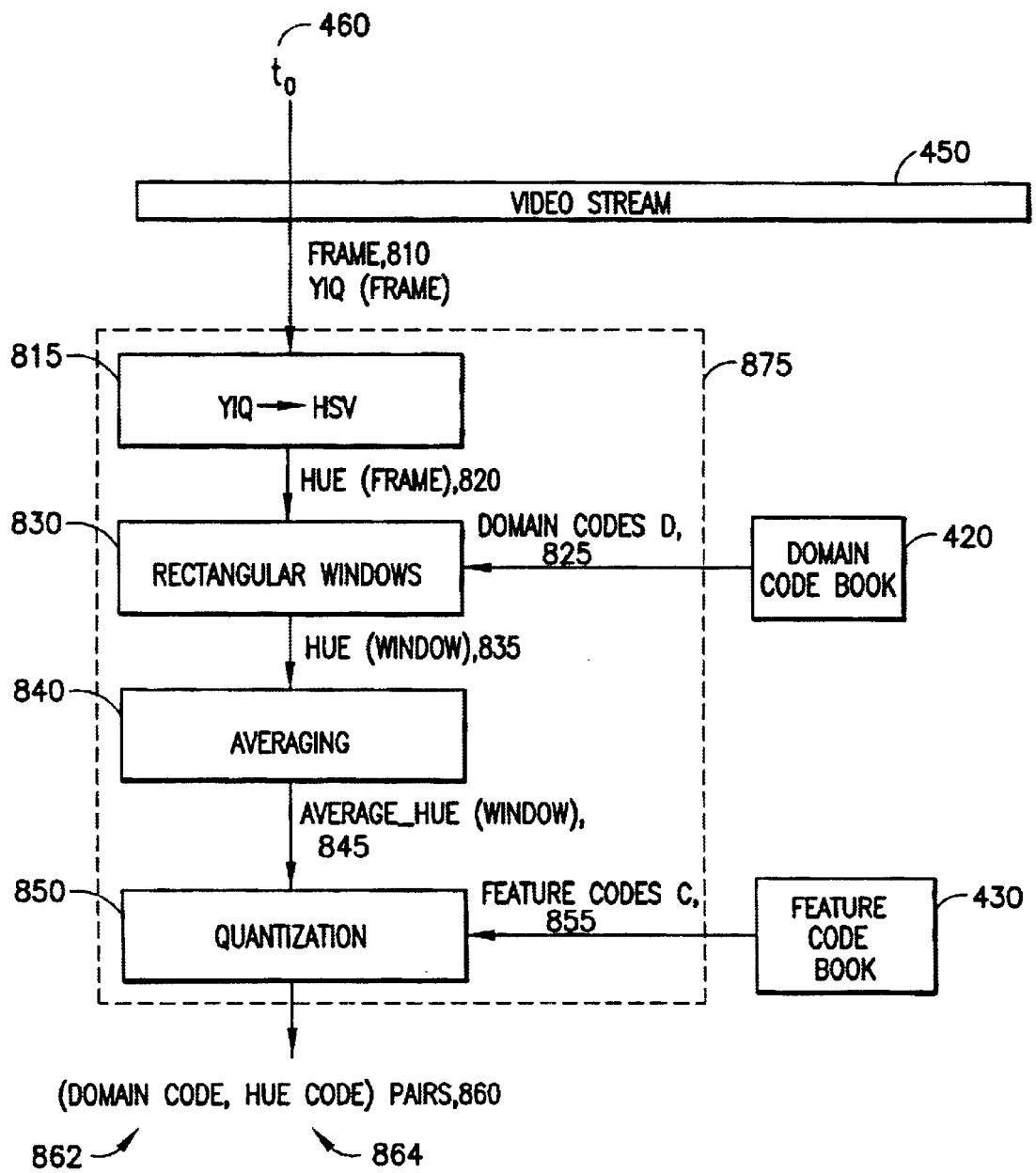
FIG. 8A is an example flow diagram of hue feature code computation for a key frame with rectangular domain regions.

Refer now to the block diagram of FIG. 8A. Let video stream 450 be the input and frame 810 at time $t_o$ 460 be the current key frame. This frame 810 could be in YIQ format and is denoted as YIQ(frame) in FIG. 8A. Then in block 875 the feature (hue) codes 864 for this frame are computed. The domain regions for the frame are rectangular windows, indexed by domain codes D 825, and hence for each domain code d in D, a feature code c from C 855 is determined. The output of step 875 therefore is a list of pairs $\{(d_i, e_i), i=1, \ldots, N\}$, with N the number domain codes (the number of windows) each $e_i$, i=1, ..., N a feature code value from the set of feature codes C. In FIG. 8A, the domain code book 420 contains the the domain codes D, pointing to the media domain (frame) windows, the feature code book 430 contains the feature codes and feature quantization information. That is, how each feature code c is associated with an interval of hue values.

The first step in 875 of FIG. 8A, is to convert the the YIQ encoded frame into an HSV encoded frame 815. This is well known in the prior art. The output then of 815 is the hue part of the color information of the frame, denoted as Hue(frame) 820. Domain codes D 825 are pointing to the domain regions which are rectangular as in FIG. 6 with windows 601, 602, ..., 603, ..., 604. Block 830 in FIG. 8 divides the frame into windows, as indicated by domain codes D. (Note that the domain subsets need not be rectangular, they can be arbitrarily shaped as show in FIGS. 5 & 5A. Rectangles are a specific case of an arbitrary shaped window.) For example, Domain Code (k) 610 points to the location of window k 603 (see FIG. 6). Further, block 830 outputs Hue(window) 835 for each window 601, 602, ..., 603, ..., 604 in the current frame. Subsequently, block 840 determines the average hue, Averagehue(window), in the windows referenced by domain codes D 825. The averaging is the first data reduction step. (Note that other averaging methods are contemplated. For example in one embodiment, the median of the window instead of the average is used and it is more robust to noise.) The second data reduction step in 875, is block 850 which quantizes Average_hue(window) into a hue code e where e is an element of the feature codes 855 C. The mechanics of this quantization is stored in the feature code book 430 and is explained in FIG. 8B. As noted above, the output of step 875 is a list of pairs $((d_i, e_i), i=1, \ldots, N)$, with N the number domain codes and each $e_i$, i=1, ..., N a feature code value.

There are a number of different ways of extracting feature values Average_hue(window) 845. For example, at one extreme case the hue value at each pixel can be considered as a feature (i.e., the windows are the pixels) or at the other extreme the hue value of all the pixels in the frame can be averaged to generate the feature value (i.e., the window is the frame). In a preferred embodiment, as indicated above, the frame is divided into $w_1$ windows in one dimension of the image and $w_2$ windows along the other dimension as in FIG. 6. An average hue value is computed based on the pixels in each window. Thus the hue color for a video key frame is a set of $w_1 \times w_2$ average hue values. Quantized these give a feature code for each domain code, denoted as ((d, c)), a list of code pairs.

Figure 8B:
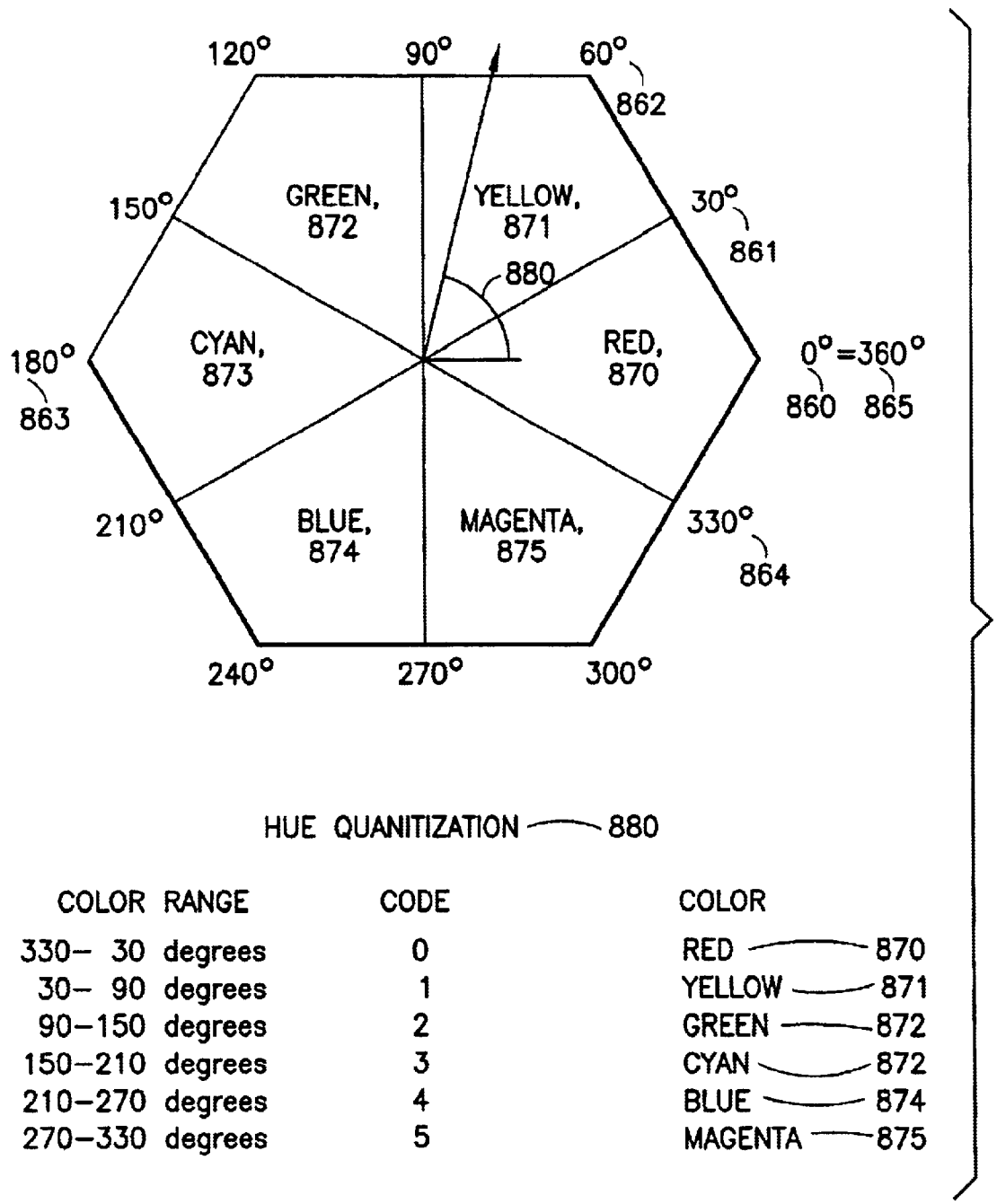
FIG. 8B gives an example quantization of hue space to define hue feature codes.

In FIG. 8B, 880 is the hue value of a pixel. The hue values can range from 0 degrees to 360 degrees, in FIG. 8B indicated by 860 (0 degrees), 861 (30 degrees), 862 (60 degrees), ..., 863 (180, degrees), ..., 864 (330 degrees), 865 (360 degrees). The hue values from 330 degrees (864) through 30 degrees (861) are centered around the color pure red (870), from 30 degrees (861) through 90 degrees around the color pure yellow (871) etc. To arrive at hue (feature) codes 855, the hue value outputs of the averaging operation 840 need to be quantized to populate the segment index table 130. This quantization to generate the hue codes 855 is performed in step 850, using feature code book 430. FIG. 8B gives the hue quantization table 880 that is stored in the feature code book 430. Coding is performed according to the following table There are several different ways in which a feature can be quantized. The choice of quantization can critically affect the accuracy of the similarity measurement and matching processes.

| Color range | Code | Color | Number in Figure |
| --- | --- | --- | --- |
| 330 < Average_hue (window) <= 30 | 0 | Red | 870 |
| 30 < Average_hue (window) <= 90 | 1 | Yellow | 871 |
| 90 < Average_hue (window) <= 150 | 2 | Green | 872 |
| 150 < Average_hue (window) <= 210 | 3 | Cyan | 873 |
| 210 < Average_hue (window) <= 270 | 4 | Blue | 874 |
| 270 < Average_hue (window) <= 330 | 5 | Magenta | 875 |

The feature-based code generation steps discussed above have been separated out as steps for clarity of presentation.

However, these steps are combined to minimize the computation required to generate these feature codes.

The feature extraction and coding process described above is one specific method of generating the feature codes. Depending on the kind of similarity metric being used, the feature extraction and coding process can be significantly different. The code representation mechanism and its efficiency in performing similarity measurements are not significantly affected by the coding scheme itself For example, one possible metric of similarity is the motion similarity of image sequences, that is, here video sequences are compared based on flow rather than color. Such a coding and similarity measurement scheme can be used within the frame work proposed in this invention (see R. Mohan, "Video Sequence Matching", cited above).

Let us assume that rectangular regions are used for feature computation. Then once the set S of reference segments, the windowing parameters ($w_1$, $w_2$), the number of features M with the number of feature codes for each feature are selected and $k_{max}$, the maximum number of key frames for the segments $s_i$ in S is computed, the dimensions of each of the M segment index tables are fixed. In FIG. 3, the hue feature for segment detection amounts to the following segment index table. The feature codes 320 along the negative z-axis 325 numbered by 350, 352, . . . , 359 are 0, 1, 2, . . . , 5. The domain codes 330 along the y-axis (335) numbered 340, 242 . . . , 349 are (0,0), (0,1), (0,2) . . . referring to the windows. The x-axes 310 of the table is the key frame number (time dimension).

Figure 9:
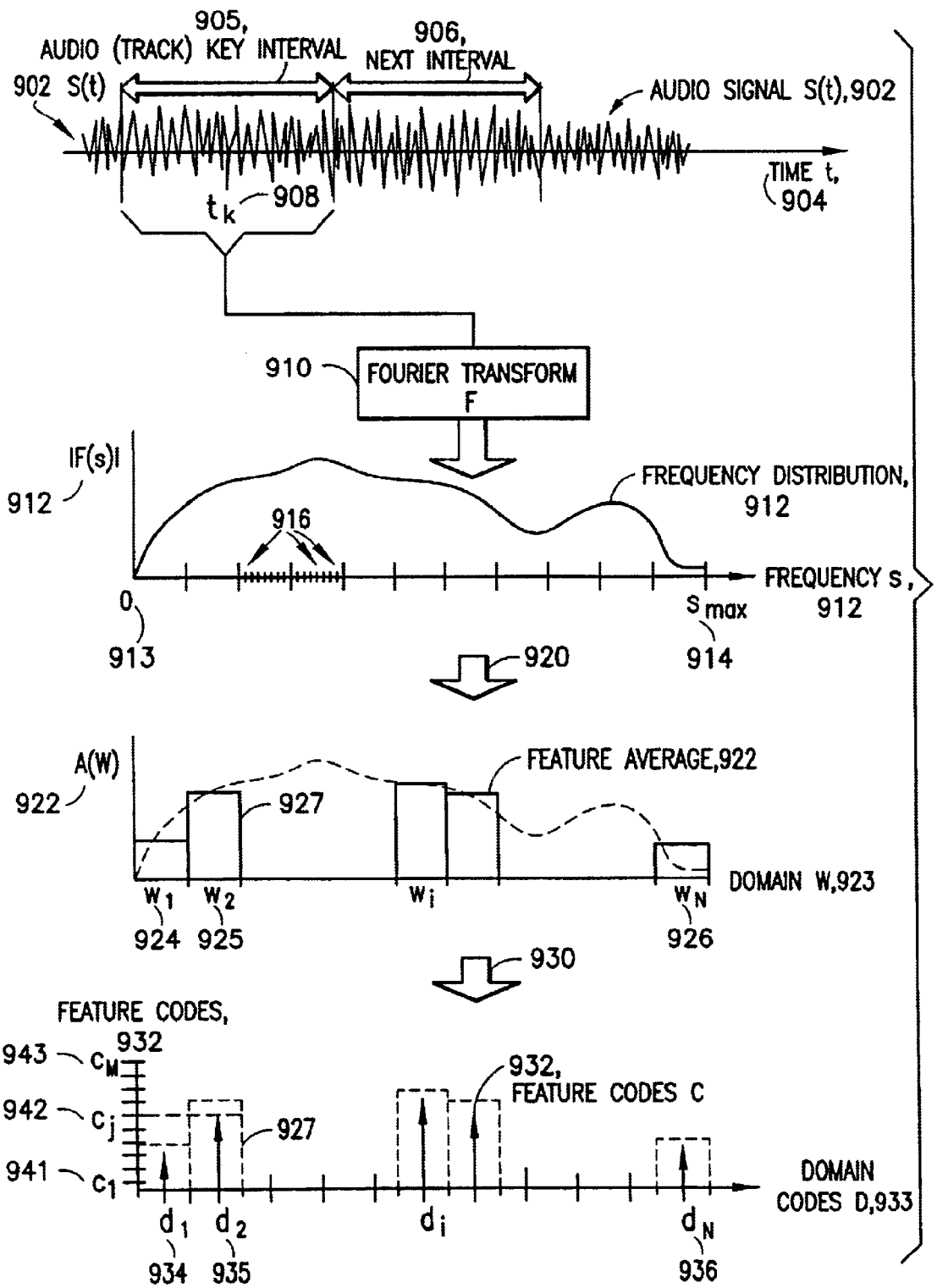
FIG. 9 is a flow diagram of feature code computation for an audio interval, where the domain codes refer to frequency bands and the feature codes average frequency magnitude in the bands.

FIG. 9 gives an example of the use of the Fourier transform for computing feature codes for the audio track 902. (Note that the use of audio is not limited to the audio track of a video signal.) The audio signal, a function of time t 904, is partitioned into audio key intervals 905 (centered around $t_k$—908), 906, . . . , etc. These intervals can be overlapping or non-overlapping and they can be regular spaced in time or irregular spaced in time. For each interval, in this case interval 905, the discrete Fourier transform 910 is computed which gives a discrete function, $|F(s)|$ 912, of frequency s, defined for s=0 (913) through s=$s_{max}$ (914). The frequency distribution $|F(s)|$ is only defined at a finite number of points 916 in the interval [0, $s_{max}$]. The frequency domain W=[0, $s_{max}$] is divided up into a set W (923) of regions $w_1$, $w_2$, . . . , $w_i$, . . . , $w_N$, (924, 925, . . . , 926) in order to compute the feature average A(W) 922 through the transformation 920. For each window w the average of the $|F(s)|$ with frequencies s in w is computed, for example, the average of $|F(s)|$ of window $w_2$, 925, is A($w_2$), 927. Also to each window in W a domain code d is assigned, that is, in FIG. 9 $w_1$ is associated with $d_1$ (934), $w_2$ is associated with $d_2$ (935), . . . , and $w_N$ is associated with $d_N$ (936). This gives the domain codes D={$d_1$, $d_2$, . . . , $d_N$} 933. The last step 930 is the computation of the feature codes 932 through transformation 930. The feature codes are a quantization of the range of the function $|F(s)|$ 912, i.e., a quantization of the interval [0, $F_{max}$), where $F_{max}$ is the maximum amplitude of F. The feature codes C 932 are shown as $c_1$, . . . , $c_j$, . . . , $C_M$ (941, 942, . . . , 943) and map into some partitioning of the interval [0, $F_{max}$), $c_1$ is associated with [0, $F_1$), $c_2$ is associated with [0, $F_2$), and so forth. Now for each domain code d, a feature code c is determined. In FIG. 9, the feature code for $d_2$ 935 is $c_j$ 942 because the quantization of A($w_2$) 927 is equal to $c_j$ 937.

Hence, in summary the input is the audio stream S(t) 902 of FIG. 9 and for interval $t_k$ 908 the output is a set pairs ((d, e))=(($d_1$, $e_1$), ($d_2$, $e_2$), . . . , ($d_N$, $e_N$)). Here $d_1$, $d_2$, . . . , and $d_N$ are the doma codes D 933 and $e_1$, $e_2$, . . . , $e_N$ are elements of C={$c_1$, $c_2$, . . . , $c_M$}, the set of feature codes. Intuitively, domain code $c_i$ refers to a frequency band, the corresponding window $w_i$ in [0, $s_{max}$], and the associated feature code $e_i$ is the average of the frequency distribution in band $w_i$. The latter is related to the amount of energy ('amount of frequency') in band $w_i$. Hence, if the audio in interval 905 is of lower frequency, feature codes for the lower domain codes tend to be of higher value. Conversely, if the audio piece 905 contains high frequencies, the higher domain codes (higher frequencies) have higher feature codes.

The domain and feature codes that are computed from a media interval are used to populate the segment index structure. There are several known different structures that may be used to store these codes, namely, a tree structure, a graph structure, a table structure, a linked list structure, etc. The index structures are a quantized representation of the media streams, where the media stream has been quantized in multiple dimensions, namely, time (through key-interval selection), domain (windowing for video, and frequency ranges for audio) and feature space (examples include, color, edges, motion vectors, etc.). Each of the index structures offers a some advantages. This embodiment of the invention uses a segment index table. This choice is motivated by the following reasons, 1. Traversal of a table structure during search is computationally efficient.
2. The table structure is well suited for representation of temporal order.
3. The table structure is also suited for an inverted index representation.
4. The table structure provides a highly compressed searchable representation of the reference media streams.

The index structures used in this invention provide an explicit representation of time. How ever this does not impose any temporal ordering on the target media stream for segments to be automatically recognized. The search algorithm which compares the target stream against the index structure can choose to recognize any number of variations in temporal ordering.

The ability to recognize a temporal ordering of a reference segment, which may be different from the temporal ordering of the reference segment used to generate the index structure, is a very important functionality. One application of this functionality is in recognizing commercials which may be shortened from their original length. The prior art has not addressed this problem. Now, let there be N domain codes D=($d_1$, $d_2$, . . . , $d_N$) and M=10 feature codes C=($c_1$, $c_2$, . . . , $c_M$) and let s(k, i) be the k-th key interval in reference media segment $s_i$. Then the set of code pairs for this interval can be as above ((d, e))=(($d_1$, $e_1$), ($d_2$, $e_2$), . . . , ($d_N$, $e_N$))=(($d_1$, $c_3$), ($d_2$, $C_2$), ($d_3$, $c_5$), ($d_4$, $c_{10}$), . . . , ($d_N$, $c_1$)), which is a compact representation of the segment interval. This can be represented in a two-dimensional table which codes the k-th key interval in reference media segment $s_i$ as follows. The table referred by T(k) contains only one entry per row—each domain code corresponds to one feature code, (not vice versa). This is Table I shown below.

Let (k, j) denote the k-th key interval in reference media segment $s_j$, this interval can similarly be represented by a string of code pairs ((d, e))=(($d_1$, $e_1$), ($d_2$, $e_2$), . . . , ($d_N$, $e_N$)). Given that the audio segment intervals (k, i) and (k, j) differ sufficiently and the feature values are sufficiently finely quantized into feature codes $c_1$, $c_2$, . . . , $C_N$ then the set of codes for these segments are different. The code pairs for instance, could be ((d, e))=(($d_1$, $c_1$), ($d_2$, $c_2$), ($d_3$, $c_7$), ($d_4$, $c_4$), . . . , ($d_N$, $c_8$). This can be added to the above table, resulting in the second table (Table II) below.

Entry (2,2) contains both i and j, none of the other entries contain (or point to) both segment intervals k of the segments i and j. This means that for domain code 2, which corresponds to a frequency window $w_2$ (925 in FIG. 9) the quantized average frequency is the same for both segment intervals. For all other frequency windows, or domain codes, the corresponding feature codes are different.

TABLE I

Segment index table T(k) for key interval k of $s_i$.

| | | | d | | |
|---|---|---|---|---|---|
| c | 1 | 2 | 3 | 4 | N |
| 1 | | | | | i |
| 2 | | i | | | |
| 3 | i | | | | |
| 4 | | | | | |
| 5 | | i | | o o o | |
| 6 | | | | | |
| 7 | | | | | |
| 8 | | | | | |
| 9 | | | | | |
| 10 | | i | | | |

If the same computations as in FIG. 9 are performed for an audio interval $M_t$ of an unknown target audio stream M, a new string of code pairs ((d, e)) is the result. Then by checking the table entry contents ((d, e))=(($d_1$, $c_1$), ($d_2$, $c_2$), ($d_3$, $c_7$), ($d_4$, $c_4$), ..., ($d_N$, $c_8$)) of the Table II, it can be determined if $M_t$ is similar to either of the two audio intervals. If many of the target code pairs of $M_t$ collide with the same reference audio interval, the target and reference interval are similar.

TABLE II

Segment index table T(k) for key interval k of $s_i$ and $s_j$.

| | | | d | | |
|---|---|---|---|---|---|
| c | 1 | 2 | 3 | 4 | N |
| 1 | j | | | | i |
| 2 | | i | | | |
| | | j | | | |
| 3 | i | | | | |
| 4 | | | | j | |
| 5 | | i | | | |
| 6 | | | | | |
| 7 | | j | | | |
| 8 | | | | | j |
| 9 | | | | | |
| 10 | | i | | | |

None of the above is limiting to just audio segments or audio segment intervals. Any one and higher dimensional signal that is a function of time and is sampled in time, is a function of the integers, or is a function of some other countable set of numbers can be indexed in the above fashion.

Figure 10:
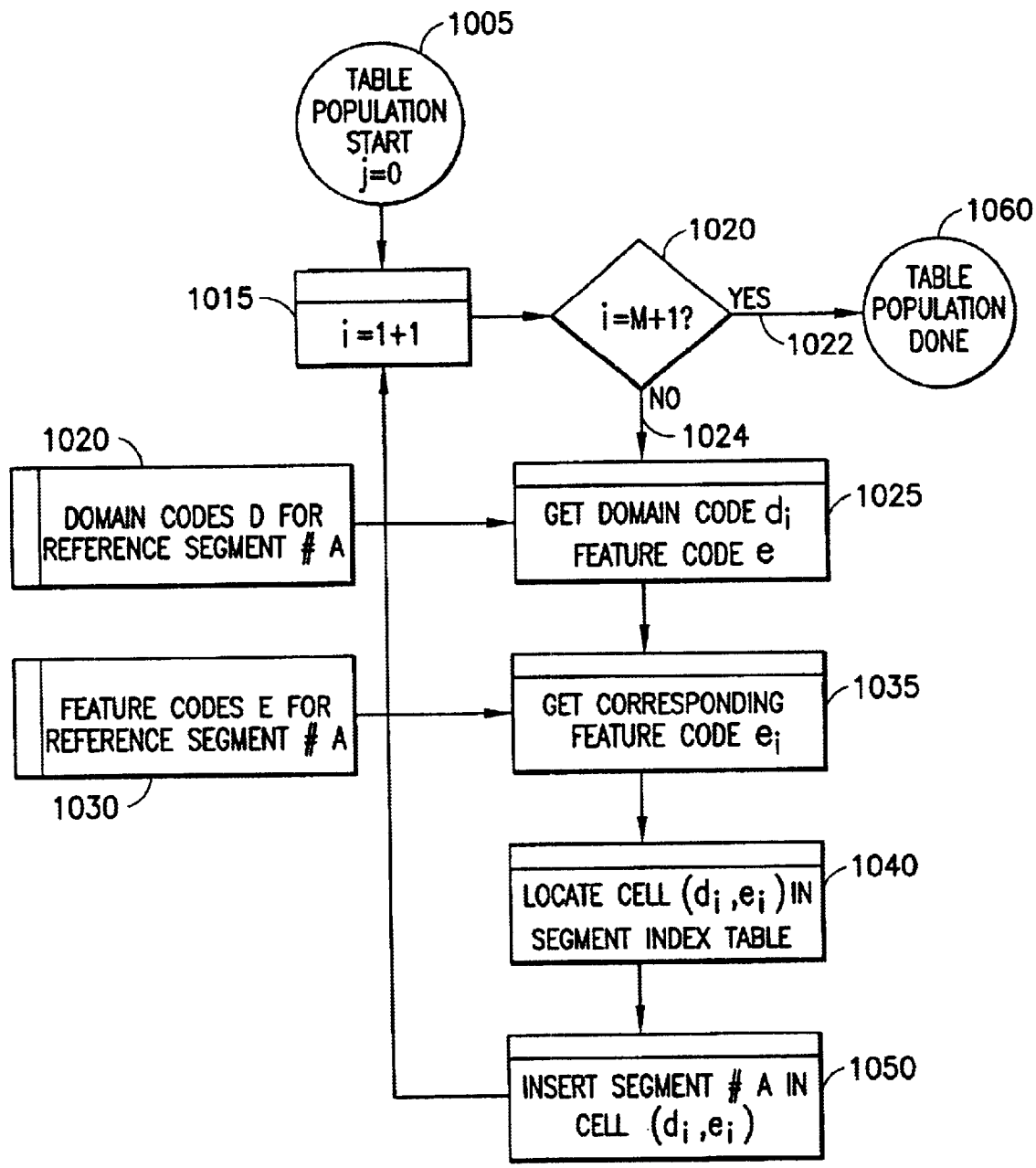
FIG. 10 is a flow diagram of the process of filling the segment index table after the feature codes have been computed.

Refer to FIG. 10 which gives a flow diagram for filling the segment index table of FIG. 3 for a given key interval at some t=k, (k, i), hereafter referred to as reference segment # A (which can be one frame). The output of step 875 in FIG. 8A, is a list of pairs $\{(d_i, e_i), i=1, \ldots, M\}$, with N the number domain codes and each $e_i$, i=1, ..., M a feature code value. Here $d_i$ is in D and $e_i$ is in C for each i=1, ..., M and C=$\{c_i$, i=1, ..., N$\}$ the possible feature codes. Hence the segment index table is. an array of N rows and M columns. Let the segment index table be initialized to NIL. The domain codes for segment A, D=($d_1$, $d_2$, ..., $d_N$) are stored in 1020 of FIG. 10 while the corresponding feature codes E=($e_1$, $e_2$, .., $d_M$) are stored in 1030. The process starts at 1005 by initializing i to zero and immediately in step 1015 setting i to i+1. In 1020 a test is performed whether all the domain codes have been handled, in which case i is M+1 (1022) and the process terminates 1060. If in 1020 i is not equal to M+1 (1024), the process continues to step 1025. In this step, domain code $d_i$ is fetched from the domain code store 1020. Subsequently, in step 1035 the corresponding feature code $e_i$ is fetched from the feature code store 1030 which has been previously computed like in FIG. 8A and FIG. 9. Step 1040 finds the cell ($d_i$, $e_i$) in the feature index table (column $d_i$ and row $e_i$) and finally segment # A is inserted in this cell. This indicates that for segment #A and key interval k the region corresponding to domain code $d_i$ resulted in a feature value which in quantized form corresponds to $e_i$.

The scheme of FIG. 10 only encodes one key interval and does not incorporate the time aspects of multiple key intervals. (Time can be omitted) or it can be incorporated into the segment index table in multiple fashions.

Omitting the time aspects amounts to not recording the time t or order k of the key intervals of the reference media segments and hence not enforcing this ordering for segment detection in the target stream. Filling of the segment index table is very similar to the filling of table II above. Again, let there be N domain codes D=$\{d_1, d_2, \ldots, d_N\}$ and M=10 feature codes C=$c_1, c_2, \ldots, c_{10}$) and let i be any key interval in a reference media segment $s_i$. Here we omit the k referring to the location of the key element. Then the set of code pairs for i might be ((d, e))=(($d_1$, $e_1$), ($d_2$, $e_2$), ..., ($d_N$, $e_N$))=(($d_1$, $c_3$), ($d_2$, $c_2$), ($d_3$, $c_5$), ($d_4$, $c_{10}$), ..., ($d_N$, $c_1$)). Another key interval of $s_i$ may have code pairs (($d_1$, $C_3$), ($d_2$, $c_2$), ($d_3$, $C_4$), ($d_4$, $C_8$), ..., ($d_N$, $C_4$)). These code pairs can be represented in the cells of the segment index table as in Table III below. For a key interval in another reference media segment $s_j$, the code pairs could be ((d, e))=(($d_1$, $c_1$), ($d_2$, $c_2$), ($d_3$, $c_7$), ($d_4$, $C_4$), ..., ($d_N$, $c_8$)). Any key element in reference segment $s_j$ is referred to by j and hence the appropriate cells in the segment index table are filled with j (Table III). This can be repeated for all key intervals in all $s_i$, i=1, ..., n in S, the set of reference segments.

TABLE III

Segment index table T for segments i and j without ordering.

| | | | d | | |
|---|---|---|---|---|---|
| c | 1 | 2 | 3 | 4 | N |
| 1 | j | | | | i |
| 2 | | i, i, j | | | |
| 3 | i, i | | | | |
| 4 | | | i | j | i |
| 5 | | | i | o o o | |
| 6 | | | | | |
| 7 | | | j | | |
| 8 | | | | i | j |
| 9 | | | | | |
| 10 | | | | i | |

Two methods for incorporating time t or order k in the segment index tables will follow. Refer to the table 1000 in FIG. 10A. This is an alternative implementation of the preferred embodiment of the segment index table in FIG. 3. This two-dimensional segment table indexes domain, feature codes associated with all the key intervals k=1, 2, 3, ..., $k_{max}$ and reference segments i andj. For instance, the first key interval of segment i (i.e., (1, i)) has code pairs (1, 3)

1032, (2, 2) 1035, (3, 5), (4, 8), . . . , and (N, 1) 1038. The second key interval of segment i (i.e., (2, i)) has code pairs (1, 1) 1042, (2, 4) 1045, (3, 1), (4, 3), . . . , and (N, 2) 1048. Hence cell (d, c) indexed by domain code d 1010 and feature code c 1020, contains a list of pairs (k, i) with k a key interval and i a reference segment. The cell (d, c) contains all key intervals where domain code is d and feature code is c for any of the segments $s_i$. Or, in other words, if for reference segment i the domain, feature code pair is (d, c) for the kth key interval, cell (d, c) of the table will contain the pair (k, i). So if for reference segment i, domain code 3 of the first key interval has feature code 5, cell (3,5) 1025 will contain (1, i). Similarly, if for reference segment i, domain code 3 of the second key interval has feature code 5, cell (3,5) 1025 will also contain (2, i). Each individual column 3030 of the reference segment table in FIG. 10A is associated with a domain code d which in turn refers to the same region in all key intervals. Since for every such region in every key interval a feature code is computed (FIG. 8A and 8B), every key interval k=1, 2, 3, . . . , $k_{max}$ and every reference segment $s_i$, i=1, 2, . . . , n (in FIG. 10A reference segments i an j) is represented. For each column 1030, every key interval k and every reference media stream identifier i the pair (k, i) is represented only once since with each domain code there is only one feature code associated.

Figure 10B:
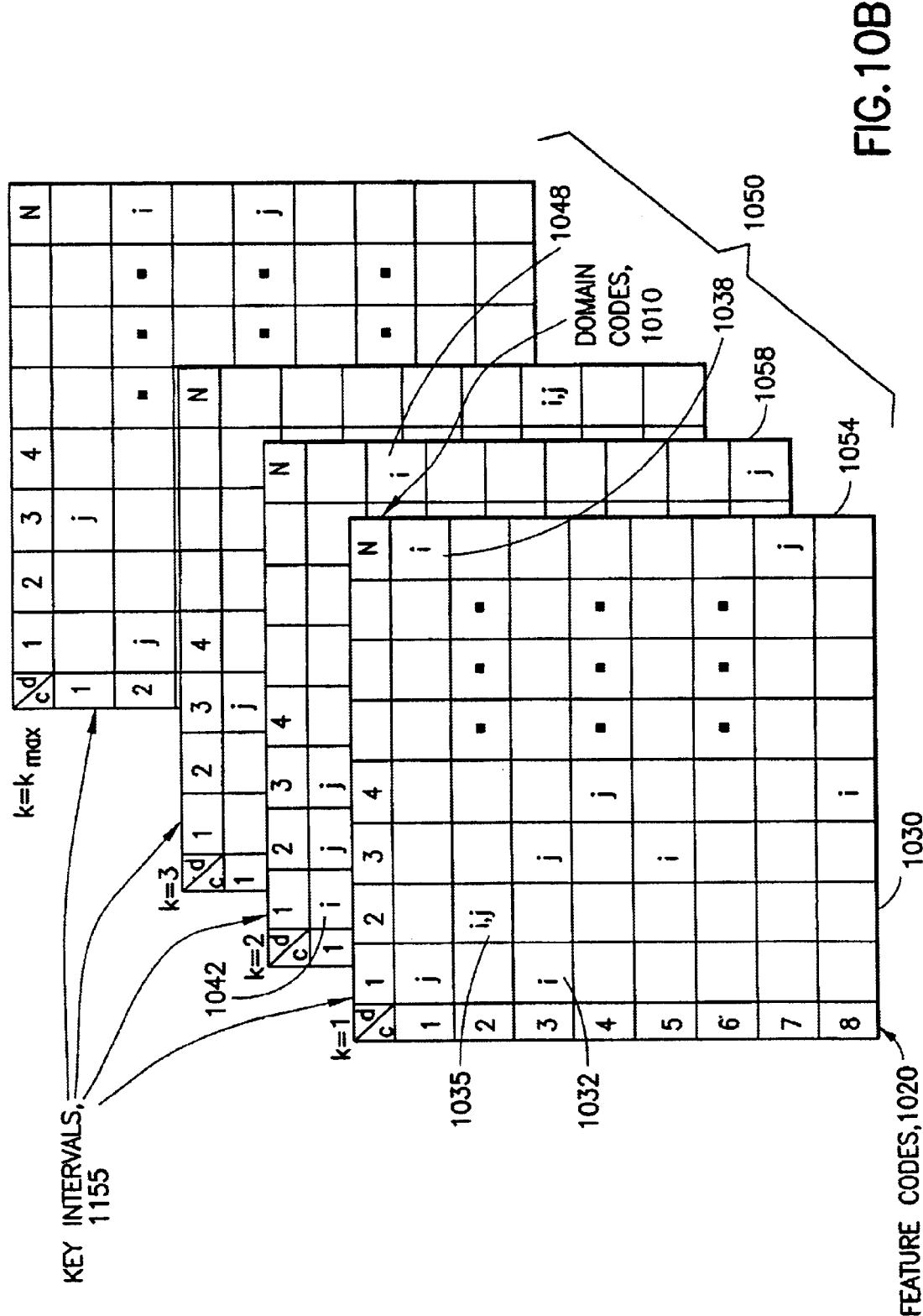
FIG. 10B is a block diagram of a segment index table where one table is used per key interval.

Turn now to FIG. 10B. Here a segment index table 1500 is shown that essentially contains the same information as the table in FIG. 10A. The columns of the table refer to domain codes 1010, while the rows refer to feature codes. But rather than using one two-dimensional for all the key intervals as in FIG. 10A, the segment index table of FIG. 10B allocates a two-dimensional array to each of the key intervals 1155. That is, the first two-dimensional array 1054 is allocated to key interval 1, the second array 1058 to key interval 2, and so on. The cells of the first array 1054 contain all the information of the segment index table of FIG. 10A that pertains to the first key interval. For example, the first key interval of segment i (i.e., (1, i)) has code pairs (1, 3) 1032, (2, 2) 1035, (3, 5), (4, 8), . . . , and (N, 1) 1038. The second key interval of segment i (i.e., (2, i)) has code pairs (1, 1) 1042, (2, 4) 1045, (3, 1), (4, 3), . . . , and (N, 2) 1048. Hence, for each array k, for kth key interval, cell (d, c) indexed by domain code d 1010 and feature code c 1020, contains a subset of reference segment identifiers S'={i, j, . . . }. This means that the feature code for domain d of the kth key interval of the reference segments in S' is equal to c. Hence, if for reference segment i the domain, feature code pair is (d, c) for the kth key interval, the cell (d, c) in the kth array of the segment index table will contain segment identifier i. Each individual column 1030 of each individual array in FIG. 10B is associated with a domain code d which in turn refers to the same region in the key interval represented by that array. Since for every such region in every key interval a feature code is computed (FIG. 8A and 8B), every key interval k=1, 2, 3, . . . , $k_{max}$ and every reference media segment $s_i$, i=1, 2, . . . , n (FIG. 10B reference segments i an j) is represented. For each column 1030 and every reference media stream identifier i, the identifier is represented only once since with each domain code there is only one feature code associated.

An example of media segment recognition is searching (scanning) a target media stream for know media segments. That is, a target media stream M (for example, a TV channel, VTR output, MPEG1 or MPEG2 or AVI or Real Video streams) is compared to the known set of reference media segments S. The goal is to recognize the occurrence of any of the known segments (reference segments) of S in the target stream M. The output of the recognition process will be a set of triplets (identity i of the segment, temporal location of the match within the segment $s_i$ and temporal location within the target media stream M). This is the index report 185 in FIG. 1. Since the target media stream is a continuous, the frames from the target media streams will have to be processed sequentially in time, while maintaining a temporal history of the matching results.

The following table shows some of the symbols used in the discussion of the segment recognition process.

| | |
|---|---|
| M | target media stream in which the reference media streams are to be recognized |
| S | set of reference media segments to be indexed, this is the set of known media segments |
| $s_i$ | reference media segment with identifier i |
| $v_i$ | number of votes received by the reference segment number i |
| T | segment index table |
| Ot | time offset into the target media stream |
| Os | time offset into the reference segment |
| Otb | beginning time offset for a section of the target media stream |
| Ote | end time offset for a section of the target media stream |
| Osb | beginning time offset for a sub-segment of the reference media segment |
| Ose | end time offset for a sub-segment of the reference media segment |
| $k_{max}$ | length of segment index table (maximum number of key intervals) |
| $L_H$ | length of history table |

The architecture of the search engine (e.g., 165 in FIG. 1) is described in FIG. 11A. The target media stream M (1101) on channel 160 can exist in a variety of media and formats. For example, the target media stream may be an analog media stream in NTSC or PAL format or it may be a digital media stream in MPEG1 or MPEG2 format. The search engine is designed to deal with any of these formats. The general philosophy of the search process is to transcode the media into a common format. Typically all formats of media have a decoder algorithm (publicly available) which outputs 24 bit RGB frames for video and pcm format audio, since these are the formats used to render the audio and video on a computer monitor. The search algorithm operates on this common format.

In FIG. 11, the incoming media stream 1101 could potentially be in any format like NTSC/PAL 1103, MPEG1/MPEG2 1109, AVI 1113, some arbitrary format xxx 1119 or Real Video 1123. Depending on the format of the media, it is processed through the corresponding decoder, NTSC/PAL 1103 through the frame grabber hardware 1107, MPEG1/MPEG2 through the MPEG Decoder 1111, AVI 1113 through the AVI Decoder 1117, some unknown format xxx 1119 through the corresponding decoder 1121, and Real Video 1123 through the Real Video Decoder 1127.

The output of each of the decoders in FIG. 11A will be some generic video frame format like RGB or YIQ 1129. The segment search algorithm operates on this 1129 data. The segment search algorithm 1133 uses the segment index table 1131, populated by the process described in FIG. 10, and the decoded target media stream 1129 to generate the search results 185, named the index report 185 in FIG. 1. The details of the search algorithm are discussed in FIGS. 11B, 12 and 13.

The process of recognizing a reference segment within a t second target stream M segment 1101 using a segment index table T is described in FIG. 11B. The segment index table T is generated by populating it with domain-feature code pairs as described in FIG. 10. The domain and feature codes are derived from the reference media segments S (110 in FIGS. 1 and 2). Time running from time 0 to time t seconds is indicated by the time axis 1107. For efficiency purposes a subset of key intervals M may be selected. The key intervals from target stream M are selected by the key interval counter Ot, the first key interval to be processed is the key interval at the start of M, Ot=Oo 1110, subsequent key intervals arc spaced by key interval increment Odelta, that is, Ot=Ot+Odelta 1115. The recognition or search process has three major steps, 1130 is the step which generates the domain and feature codes for the present key interval Ot of the target media stream M 1101. In block 1150 these codes are used to select the L most similar key intervals of the reference segments S 110 (described in FIG. 12). Block 1170 keeps track of these matches provided by 1150 over multiple key intervals in the target stream. Block 1170 also uses this tracking information to delineate a start-time and end-time in the target media stream M for the matching subintervals of the reference segments S and declare the results of the search process, the index report 185 in FIG. 11B (described in FIG. 13).

As stated above, step 1110 initializes the key interval counter Ot to the desired start position Oo, typically the first key interval of media stream M. Here the key interval increment Odelta is initialized to the number of key intervals by which the media M should be advanced each processing cycle. This value is typically set to one (one key interval for video media or audio media).

Step 1130 is the code generation process for the selected key interval in the target media stream at offset Ot. In the case of video media one possible code generation process (hue codes) has been described in FIG. 8A. In the case of audio media one possible code generation process (frequency content) has been described in FIG. 9. However, any code generation process resulting from some region transformation 406, FIG. 4A, or media transformation, 417, FIG. 4B, may be used here. The result of this code generation process is shown in 1140. It comprises the relative time offset into the target media where the code generation occurred, Ot, the set of target domain codes extracted at that point and the corresponding set of target feature codes that is, $((d, c))=((d_1, c^*), (d_2, c^*), (d_3, c^*), (d_4 c^*), \ldots, (d_N, c^*))$. Here $c^*$ is any c in $C=\{c_i, i=1, \ldots, N\}$, the possible target feature codes.

Step 1150 performs the process of taking the domain and feature codes 1140 and searching for matches in the segment index table T. A detailed description, indicated by A 1155, of the steps performed within step 1150 is given in FIG. 12. The result of the search process is the winner table 1160. This comprises, a list of top L key intervals of the reference segments that best match the target media key interval under consideration (at Ot).

Step 1170 takes the winner table as input, accumulates the results over multiple key intervals Ot and produces the index report, shown in 185 in FIG. 11B. The result comprises the R different reference segments $s_r$, r=1, ..., R to which a particular section [Oth, Ote] of the target media stream M matches (we refer to it as 'section' to distinguish it from reference segments and key intervals). For each potential match, the sub segment [Osbr, Oser] within the reference segment $s_r$ which matches and the number of votes it polled are also part of the index report 185. The number of results R declared at each target media stream offset Ot, cart vary from 0 to n, where n is the number of reference segments in set S represented in the segment index table T. Typically, in an application like detecting commercials in a live TV feed, R will be 0 most of the time (during program blocks) and will be 1 at sections [Otb, Ote] of M where known commercials are inserted.

Once the results of matching at offset Ot are computed, step 1190 checks for the end of the media stream. This step is applicable only in the case of disk based media like MPEG video files or MP3 audio files. In the case of streaming media like TV feeds there is no physical end of the media. In case the end of media has been reached, the processing stops 1195. If the end of the media stream has not been reached, the target media stream M 1105 is advanced by Odelta as shown in 1115.

Figure 12A:
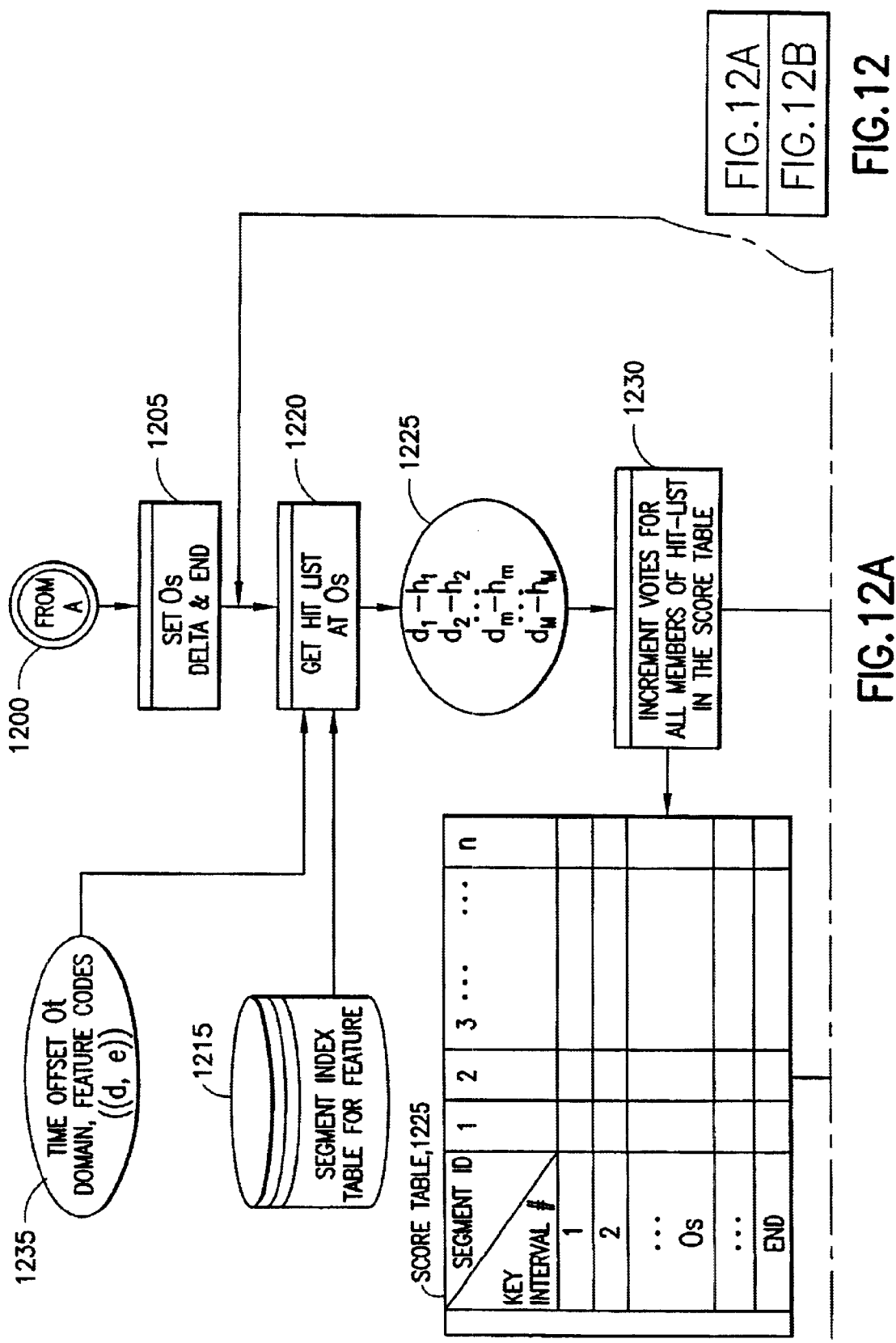
FIG. 12 is a detailed flow chart of the process of searching using the segment index table.
Figure 12B:
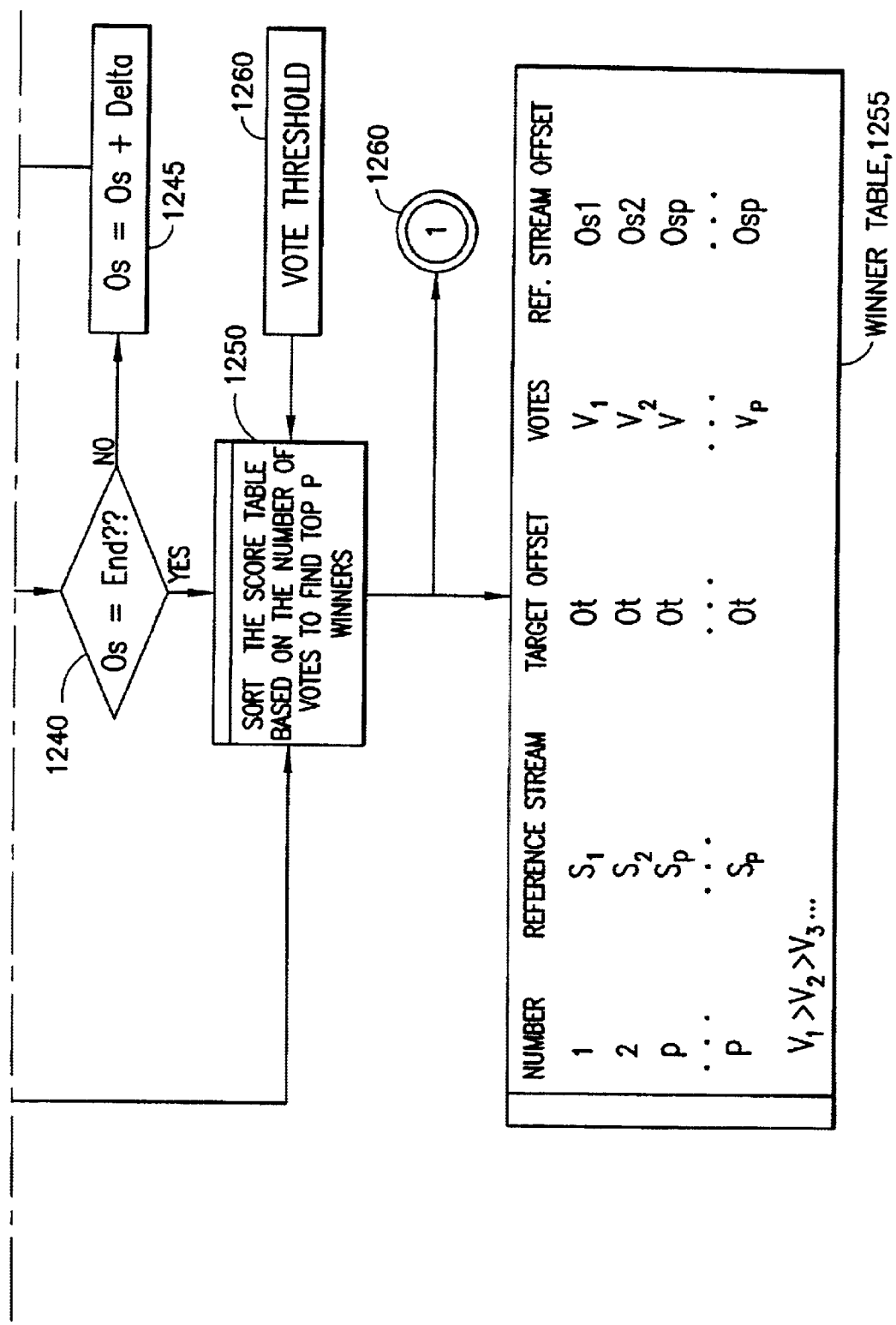

FIG. 12 describes the process of searching the segment index table T (1150 of FIG. 11). The code pairs (shown as 1235 in FIG. 12), $((d, c))=((d_1, c^*), (d_2, c^*), (d_3, c^*), (d_4, c^*), \ldots, (d_N, c^*))$ computed from M at some time offset Ot 1140 from FIG. 11 are used as the input to the search process. That is, the code pairs are used to index the segment index table T. The process in FIG. 12 finds the closest P reference segment key intervals to target key interval Ot tabulated in the winner table 1255.

The process in FIG. 12 begins at 1200, which is a connection to reference segment search (1155 of FIG. 11). The first step in the search process is 1205, which sets the range of reference segment key intervals to be searched in the segment index table. Os is the offset (measured in key intervals) into the index table at which the search begins, End is the offset at which the search ends and Delta is the incremental offset between search cycles. Typically Os would be set to 0 and End would be set to $k_{max}$ (length of the segment index table, the maximum number of key intervals found in the reference segments). This ensures that all the key intervals in the segment index table are matched against each of the key intervals extracted from the target media stream. This setting ensures the recognition of a target media stream that contains any sub segment of the reference media stream. The search range can be altered each time a new key interval from the target media is being matched. Thus, the search space in the segment index table can be dynamically pruned (for example, once the leading portion of a reference segment has been detected, further searches could be performed against later portions of the segment index table). Such a pruning strategy is applicable for applications where the target stream includes the reference segment streams in their entirety without any modifications. Implementation of this, and other, search pruning strategies are obvious to those skilled in the art. Using the complete table for all searches (no dynamic pruning), on the other hand, allows for recognition of target stream sections which are composed of multiple sub-segments of one or more reference segments in random temporal order.

Step 1220 uses the segment index table 1215 and the domain code, feature code pairs ((d, c)) pairs 1235 (which are the same as 1140 in FIG. 11) to generate a hit list. For every domain, feature code pair $(d_n, c^*)$, n=1, ..., N this step generates a hit-list from the segment index table. The hit list $h_n$ corresponding to code $(d_n, c^*)$ is a list of reference segment identifiers, a subset of S. It is the set of reference segments which have the same domain code $d_n$ and feature code at offset Os as the target stream M at Ot. The cardinality of $h_n$ can be anywhere between 0 and the cardinality of S (total number of reference segments). The hits generated by the domain, feature codes ((d, c)) are given by $H=(h_1, h_2, h_3 \ldots h_N)$. In fact, every domain code $d_n$ gives a hit list $h_n$, 1225 shows the hits the domain code and the corresponding hit list obtained from the segment index table. In summary, the output 1225 of 1220 is a count of how key interval Os of the various reference segments S fit the target stream key interval Ot. Each domain $d_n$ in the target key interval generates a hit list, that is, the reference segments for which at Os and domain $d_n$ the feature code equals the feature code of the target key interval.

Step 1230 uses the hit list H generated by 1220 to accumulate hits in the score table (1225). The score table is a two-dimensional table of size (End×n). In this step, for each member of the hit list H (these members are reference segment identifiers) at offset $O_s$ (this is always between 0 and End), the corresponding cell in the score table (1225) is incremented by 1. Thus the score table accumulates the hits against each reference segment identifier i=1, ..., n and reference segment key interval Os. With $\underline{H}$ the union of ($h_1$, $h_2$, $h_3$ ... $h_N$), the (Segment ID, Os) cell will contain t count of segment $s_i$ with i=SegmentID in $\underline{H}$.

Step 1240 compares the current offset in the segment index table Os to the end of the search range End. If the search is within the specified range (Os<End) the offset is incremented in step 1245 by Delta and the search process described above repeats at the new offset. If the offset is outside the specified range (Os=End), the search process ends.

Once the end of search interval End is reached, the results in the score table are processed in step 1250. The entries of score table 1225 contain votes for (i, Os) pairs, with i a segment identifier. These entries are sorted in the descending order of the votes polled by each reference segment i at each of its key intervals Os. The votes in the sorted list are compared against a threshold 1260. All the entries in the sorted list that are below the vote threshold are removed from the list. After the thresholding operation, the top P items in the list are selected and output into the winner table, 1255. The winner table now lists for key interval Ot of the target stream which reference segment key interval Os1 of all key intervals in S fits best, which reference key interval Os2 of all key intervals in S fits second best, and so on. Hence we have an ordering of (reference segments, key interval) pairs. P is the number of similarly entries that are tracked over time. The winner table 1255, has the following entries, the order number p, p=1, ..., P, the reference segment identifier $s_p$, the number of votes $v_p$ polled for this reference segment, the offset (key interval) Osp at which these votes were polled and the target segment offset Ot that caused these matches.

The winner table 1255 is used in the history and segmentation process 1170 of FIG. 11B. The detailed description of 1170 is provided in FIG. 13. Connector 1260 in FIG. 12 is used as the start 1305 of FIG. 13.

Figures 13, 13A, 13B:
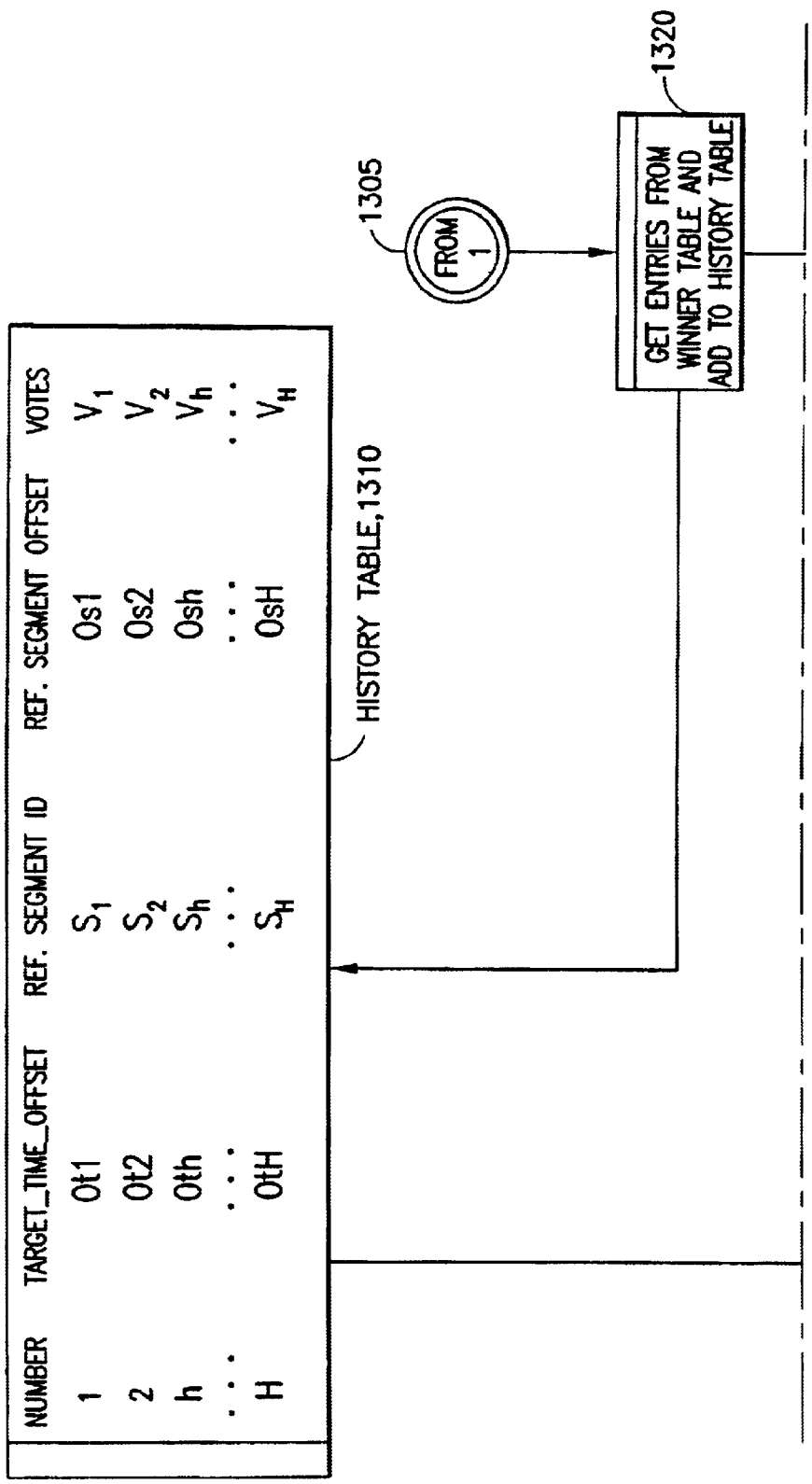
FIG. 13 is a detailed flow chart of the vote history and segmentation process that shows the process involved in accumulating votes over multiple key-intervals and declaring match results.
Figure 13B:
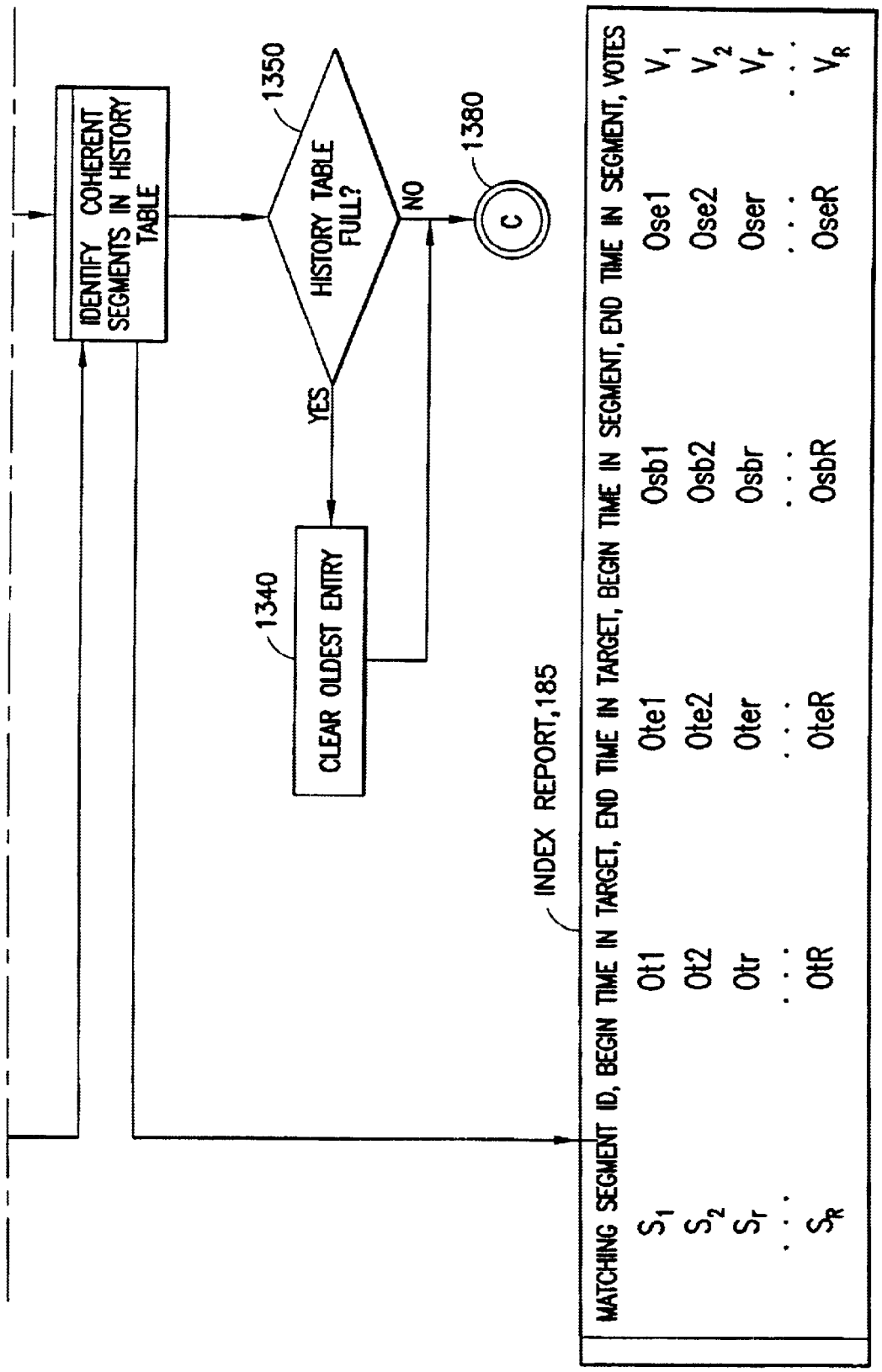

FIG. 13 describes the vote history accumulation and segmentation steps (1170 of FIG. 11A). The connector 1305 in FIG. 13 comes from connector 1260 in FIG. 12.

Step 1320 takes entries from the winner table (1255 of FIG. 12) and merges these in the history table, 1310 (at Ot=Oo, the history table is initialized as the winner table) The history table (1310) acts as a cache for a fixed number of search results. The result of the past H searches (winner tables) can be cached in the history table. That is, the last H target stream interval matches at Oth, h=1, ..., H to reference segment intervals are merged into the history table 1310. The length of the table, formed by merging H winner tables is $L_H$=H. The history table allows for identifying coherent segments 1330 by detecting contiguous target key interval offsets, Ot3, Ot4, Ot4, that are associated with contiguous segment key intervals Os1, Os2, Os3. The table also allows for filtering of spurious hits which exhibit themselves by gaps in the contiguous Oti, Osj pairs. Spurious hits can occur because of changes in the media characteristics caused by different encoding parameters (bit-rates, frame sizes in the case of video, varying sampling rates, recording levels and channel composition in the case of audio), noise introduced by acquisition devices (frame grabbers and microphones) and several other factors. Mismatches can also potentially occur due to the coding process. Also potentially, one target media stream section can match sub-segments of multiple reference media streams.

Step 1330 filters the history table based a several different filtering criteria, like minimum number of contiguous hits on a segment and temporal ordering of the hits. The thresholds used for these operations need to be chosen based on the application. For example in the case of detecting commercials in a live TV feed, the minimum number of contiguous hits required would be 3 matching frames. This translates to a clip of video 0.1 sec's long, (1/10 second×30 frames/second=3 frames).

The output of step 1330 is the index report 185. The result comprises of R matching entries, the number of sub-segmelts of reference segments in S that match some section in target stream M. Each entry in the result table comprises, the matching reference stream identifier r element of S, the begin-time and end-time offsets Otbr and Oter of the matching section in the target media stream M, the begin-time and end-time offsets Osbr and Oser into the reference stream $s_r$, and the number of votes $v_r$.

Step 1350 compares the number of entries in the history table to the length of the history table $L_H$. If the table is full it clears the oldest (first) entry in the history table. After this operation the control flows via 1380 to 1180 in FIG. 11. If the end of the target media stream is not reached, the target media is advanced and the search continues (as described in FIG. 11).

Application of the Invention

We list a number of applications that are hard or impossible to achieve with prior art technology. The following is a business method and method of use that is detailed and claimed in U.S. patent application Ser. No. 09/496,928, entitled BUSINESS METHOD AND METHOD OF USE FOR MEASURING SIMILARITY BETWEEN A SET OF KNOWN TEMPORAL MEDIA SEGMENTS AND A ONE OR MORE TEMPORAL MEDIA STREAMS, with the same inventorship, filed on the same day as this disclosure, and that is herein incorporated by reference in its entirety.

A first application is monitoring a given television or radio broadcast for the occurrence of instances of a pre-specified set of media segments. Such broadcast monitoring can be used to detect any type of pre-produced media material. The more typical use is for verifying the broadcasting of TV or radio commercial messages (advertisements). Advertisers (companies whose products are being advertised) require an independent verification of the actual broadcasting of the commercial in order to make payments to the broadcaster. This process currently relies on a human viewer sampling the channel to verify the airing of a commercial. Hence, it is a labor intensive and error prone process.

The similarity measurement process described in this invention can be used to serve the function of the human viewer. The commercial messages to be monitored is a set reference media streams S. As described in this invention, these reference media streams are used to generate an index representation called a segment index table (T-commercial). To monitor a given channel, Channel X, (a target media stream) for commercials, a computing system that houses the search engine described in this invention is used. Depending on the type of broadcast (National Television System Committee (NTSC), Phase Alternating Line (PAL), digital, analog/digital audio), the media source (tuned to Channel X) is decoded and input to the computing system.

The search engine operates on the target media stream and produces an index report. This index report, in the case of commercial monitoring, will include the title of the commercial detected (reference segment identifier), the date and time at which the commercial started, the date and time at which the commercial ended and the match quality (the votes it received).

The same apparatus can be used to perform quality control operations on the commercials (reference media streams) that are being monitored. In this case, the index report will include a list of offsets into the recognized reference media stream, if any, at which the match qualities (number of votes received) were below an acceptable threshold.

Locating copies of media on the Internet is another application of the present invention. This application involves searching for digital copies of media (audio or video) on the Internet. With the wide spread use of digital media (audio and video), the illegal copying and distribution of media are emerging as a significant problem for the media industry. For example, there are a number of web sites that post illegal copies of music and video on the Internet. The media is encoded in one of the popular formats (MP3 for audio; MPEG1 or MPEG2 for video). Typically, the filenames under which the media is posted, are not indicative of the content of the media files. To identify a posted media file (MP3 or MPEG) as a known media stream, a comparison of the media content of the file (video or audio key intervals) is necessary.

The search method described in this invention can be used to perform the comparison. In this case, the media streams of interest (say several movies) are used as the reference media segments to generate a representation called the segment index table (T-movie). The search engine is now deployed with the segment index table (T-movie). The target media files are transferred from web sites at the Internet to the computing system that houses the search engine described in this invention. That is, the media needs to be downloaded or streamed to the machine on which the search engine is running. The downloading operation can be achieved in multiple ways, an operator could feed URL's to down loader software, which would download the files to the local machine or alternatively, a web crawler robot could be designed to locate URL's that hold media files. This can be done by looking at the filename extensions (.mp3, .mpeg, etc). The URL's located by the crawler robot or human operator can be filtered based on various criteria, like size of the media files, to generate a list of URL's for downloaded software.

Once a target media stream has been downloaded to the local machine the search engine is deployed to generate an index report.

This application provides functionality similar to video water marking in that the search engine detects the intrinsic properties (features) of the media instead of the embedded water marks.

An application of the present invention targeted towards the task of video indexing is video event detection. Video indexing can be defined as the operation of designating video segments with certain predefined labels. There exists a significant body of prior art on the subject of video indexing. For example, consider a video of a soccer game, indexing this video will result in annotation table that looks as follows

| Event Number | Begin Time | End Time | Label |
| --- | --- | --- | --- |
| 1 | 00:00:10:12 | 00:00:12:10 | Penalty Kick |
| 2 | 00:20:12:10 | 00:20:13:10 | Field Goal |
| 3 | 00:33:12:09 | 00:35:12:10 | Penalty Corner |
| 4 | ... | ... | ... |

There are several approaches to generating such indices, using software algorithms, described in the prior art. One of the approaches to event detection has been disclosed in R. Mohan. This approach uses reference video segments (examples of how a typical event would look like) and compares the target stream to the reference video segment based on generating codes for both the reference segment and the target segment. The discussion provided by Mohan however does not address the problem of performing such similarity measurements between a target stream and a multiplicity (large number) of reference streams. Essentially, the target stream is simultaneously compared to the reference segments in a sequential fashion, one reference segment at a time. This inherently limits the number of reference segments that can be used in the comparisons.

The similarity search method discussed in this invention can be applied to the video event detection problem as follows. The multiple example videos for the events to be detected are selected. These videos form the reference media streams S. The reference media streams are used as input to the index generation process. In this process, the motion similarity codes discussed by Mohan are extracted from the reference segments. These codes are used to populate a segment index table (T-event).

The search engine described in this invention is deployed with this segment index table (T-event). The target media stream (the video to be annotated) is fed to the appropriate decoder and the search engine operates on the target media stream to generate the index report. This index report is a tabulation of the events in the target stream as shown in the table above.

This event detection is not limited to off-line video annotation, but also can be performed in real-time. Applications are in the arena of surveillance, monitoring and human machine interaction. Events, such as, dangerous situations, human gestures, etc. Can be detected in real time by employing the search engine described in this invention with an appropriate segment index table.

The present invention can be employed in the management of large audio and video databases. Such collections of audio or video clips need to be managed and searched in several environments like TV news, documentary, movie and sitcom productions. In these production environments, audio and video segments in the database will be used to produce program material, often the same media segment in different productions. It is important to keep track of the usage of a media segment from the perspective of rights management and royalty payments. The similarity measurement method discussed in this invention can be used in this process.

In this case, the index generation phase and the search phase operate repeatedly in sequence. The following steps outline the usage of the similarity measurement method in video database indexing and management.

Every media item (s) which is entered into the database is first used as target media stream and searched against the segment index table of the database (T-database). This operation generates an index report. (In the case of the very first video item entered into the database, this step will be skipped and the entire item will be used as the reference media stream and inserted into the segment index table, T-database.)

Based on the index report, the segments of the media item (s) that are unique (no matches were reported in the index report) are used as reference media streams for the index generation process, which adds the corresponding codes to the segment index table (T-database).

The index report is stored along with the database and used to keep track of the content usage.

As per the above procedure, the segment index table will continually grow as more and more media items are added to the database. Once, the database of media is indexed in terms of content usage, several tasks, like removing redundant copies of the video, selecting all videos that contain a specified segment, etc., are straightforwardly accomplished.

The present invention can also be used for detecting patterns in non signal data streams. One such application is in computer virus detection. Here the known computer virus patterns are treated as the reference streams. The reference virus patterns are used to generate a virus index structure. The search for viruses will use the data taken from the hard disk as the target stream. The search engine matches the target stream against the index table and identifies portions of the target stream which are close matches to the viruses.

We claim:

1. A computer system for associating one or more features codes with one or more reference streams, the system comprising:
   one or more central processing units and one or more memories; and
   an index generation process that creates one or more of the feature codes by performing the steps of:
   selecting a key interval from a reference stream;
   transforming a media region of one or more selected key intervals of the media stream into one or more characteristic feature spaces;
   quantizing the characteristic spaces into one or more domain regions;
   deriving domain codes based on one or more domain regions selected from one or more characteristic spaces;
   quantizing one or more feature values to determine the feature codes associated with each domain region; and
   using the feature and domain codes to index into a memory index structure which associates the respective feature codes and domain codes with one or more parts of the reference streams from which they were derived.

2. A system, as in claim 1, where the memory structure is any one or more of the following: a table, a structured index, a tree, and a connected graph.

3. A system, as in claim 1, where the media stream includes any one or more of the following: a audio stream, a video stream, an information stream, a digital information stream, and a digital information stream that may contain viruses.

4. A system, as in claim 1, where the domain regions are quantizations of one or more characteristic spaces of the reference stream, including any one or more of the following: one or more audio frequency ranges, one or more regions of an image, one or more frames of a video, one or more data packets, and one or more set intervals of a temporal signal.

5. A system, as in claim 1, where the feature values are derived based on computations from the reference streams, including any one or more of the following: a hue, an amplitude, a frequency, a brightness, and an optical flow.

6. A system, as in claim 1, where the parts of the media stream include any one or more of the following: the entire media stream and one or more of the selected key intervals.

7. A system, as in claim 6, where the key intervals are selected based on one or more of the following criteria: non-overlapping regular intervals of the reference stream, overlapping regular intervals of the reference stream, a repeated pattern of overlapped intervals of the reference stream, a repeated pattern of non-overlapped intervals of the reference stream, and an analysis of the content of the reference streams.

8. A system, as in claim 1, where the order in which the steps of transforming a media region, deriving domain codes, and quantizing feature values are interchangeable.

9. A system, as in claim 1, the feature codes and domain codes are invariant to some set of transformations of the reference streams.

10. A system, as in claim 1, where the index generation process associates the feature codes with a reference media stream in the memory structure.

11. A system, as in claim 1, where a recognition of one or more target media streams is performed by a recognition process having the steps of:
    transforming a target media region of one or more target selected key intervals of the target media stream into one or more target characteristic spaces;
    quantizing the target characteristic spaces into one or more target domain regions;
    deriving domain codes based on one or more domain regions selected from one or more characteristic spaces;
    quantizing one or more target feature values to determine the target feature codes associated with each target domain region; and
    using the target feature codes and domain codes in conjunction with the index structure to determine a similarity score between the target stream and each of the reference streams represented in the index structure.

12. A system, as in claim 11, where
    the order in which steps of transforming the target media region, deriving domain codes, and quantizing feature values are interchangeable.

13. A system, as in claim 11, where the feature codes and domain codes are invariant to some set of transformation of the reference streams.

14. A system, as in claim 11, where a similarity score is determined as follows by performing the following steps:
    using the target domain and feature codes to accumulate votes for each of the reference streams and selected key intervals with the reference streams;
    matching a reference stream and a key interval within the reference stream based on the votes accumulated;
    tracking the matches over successive target key intervals to determine temporal ordering of the matches; and
    selecting one or more matching reference streams and one or more matching intervals within each of the selected matching reference streams and associating them with one or more of the selected key intervals of the target stream.

15. A method for creating a search index for one or more media streams, the method comprising the steps of:

transforming a reference media region of one or more reference selected key intervals of the media stream into one or more characteristic spaces;

quantizing the characteristic spaces into one or more domain regions, each of the domain regions having a reference domain identifier;

quantizing one or more feature values to determine one or more feature codes associated with each domain region; and creating an index using the respective feature codes and domain identifiers.

16. A method, as in claim 15, where the media stream is a reference media stream and the respective feature code is a reference feature code and the respective domain identifier is a reference domain identifier.

17. A method, as in claim 16, further comprising the steps of:

using the index to associate the respective reference feature codes and reference domain identifiers with one or more parts of the reference media stream in one or more indexed memory structures.

18. A computer program product which performs the steps of:

transforming a reference media region of one or more reference selected key intervals of the media stream into one or more characteristic spaces;

quantizing the characteristic spaces into one or more domain regions, each of the domain regions having a reference domain identifier;

quantizing one or more feature values to determine one or more feature codes associated with each domain region; and creating an index using the respective feature codes and the domain identifiers.

19. A system for creating a search index for one or more media streams, the system comprising:

means for transforming a reference media region of one or more reference selected key intervals of the media stream into one or more characteristic spaces;

means for quantizing the characteristic spaces into one or more domain regions, each of the domain regions having a reference domain identifier;

means for quantizing one or more feature values to determine one or more feature codes associated with each domain region; and means for creating an index using the respective feature codes and the domain identifiers.

20. A method for creating a search index for one or more media streams, the method comprising the steps of:

transforming a reference media region of one or more reference selected key intervals of a target media stream into one or more characteristic spaces;

quantizing the characteristic spaces into one or more domain regions, each of the domain regions having a reference target domain identifier;

quantizing one or more feature values to determine one or more target feature codes associated with each domain region; and creating an index using the respective target feature codes and target domain identifiers.

21. A method, as in claim 20, further comprising the steps of:

using the target feature codes and target domain identifiers to index into an indexed memory structure; and tracking the number of successful hits on the indexed memory structure to determine that the target media stream has been indexed in the indexed memory structure.

22. A method, as in claim 21, where a successful hit occurs when the target feature code and target domain identifier create an index similar to one of the indexes in the indexed memory structure.

23. A method, as in claim 22, where a successful match occurs when there is a series of successful hits in a temporal order listed in the indexed memory structure.

24. A method, as in claim 23, where the temporal order is pre-specified.

25. A method, as in claim 24, where the pre-specification includes any one or more of the following: a time order, a reverse time order, and one or more time intervals.

26. A method, as in claim 21, where a reference media stream indexed in the memory structure is one or more commercials and the target media stream is one or more television shows.

* * * * *